United States Patent
Gemperle et al.

(10) Patent No.: US 10,775,396 B2
(45) Date of Patent: Sep. 15, 2020

(54) SAMPLE HANDLING DEVICE AND METHOD FOR SAMPLE HANDLING

(71) Applicant: Roche Diagnostics Operations, Inc., Indianapolis, IN (US)

(72) Inventors: Sabrina Gemperle, Buchs (CH); Eugen Lusser, Aplnach Dorf (CH); David Huber, Ebikon (CH); Michal Malinowski, Backnang (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 245 days.

(21) Appl. No.: 15/970,988

(22) Filed: May 4, 2018

(65) Prior Publication Data
US 2018/0252737 A1    Sep. 6, 2018

Related U.S. Application Data

(63) Continuation of application No. PCT/EP2016/077472, filed on Nov. 11, 2016.

(30) Foreign Application Priority Data

Nov. 12, 2015   (EP) .................................... 15194227

(51) Int. Cl.
    *G01N 35/00*   (2006.01)
    *G01N 35/04*   (2006.01)
(52) U.S. Cl.
    CPC ....... *G01N 35/00732* (2013.01); *G01N 35/04* (2013.01); *G01N 2035/00752* (2013.01);
    (Continued)
(58) Field of Classification Search
    CPC ............. G01N 35/00732; G01N 35/04; G01N 2035/00752; G01N 2035/0477; G01N 2035/0406; G01N 2035/0415; B65G 5/02
    See application file for complete search history.

(56) References Cited

U.S. PATENT DOCUMENTS

| | | | | |
|---|---|---|---|---|
| 5,127,509 A | * | 7/1992 | Kohlen | B65H 67/086 198/345.3 |
| 5,897,090 A | * | 4/1999 | Smith | B01L 9/06 206/306 |

(Continued)

FOREIGN PATENT DOCUMENTS

| EP | 2774678 A1 | 9/2014 |
|---|---|---|
| EP | 2566787 B1 | 3/2016 |

(Continued)

OTHER PUBLICATIONS

International Search Report dated Jan. 2, 2017, in Application No. PCT/EP2016/077472, 4 pages.

*Primary Examiner* — Daniel S Larkin
*Assistant Examiner* — Anthony W Megna Fuentes
(74) *Attorney, Agent, or Firm* — Roche Diagnostics Operations, Inc.

(57) ABSTRACT

A sample handling device is presented. The sample handling device comprises at least one magnetic positioning device for magnetically holding a carrier configured for carrying at least one vessel in the sample handling device. A sample identification device is also presented. The sample identification device comprises at least one of the above sample handling device and at least one reader for reading at least one identifier attached to the vessel carried by the carrier. A system for sample handling, a diagnostics device for identifying at least one property of a plurality of samples and a method for handling a sample are also presented.

12 Claims, 10 Drawing Sheets

(52) U.S. Cl.
CPC ............. *G01N 2035/0406* (2013.01); *G01N 2035/0415* (2013.01); *G01N 2035/0477* (2013.01)

(56) References Cited

U.S. PATENT DOCUMENTS

| | | | |
|---|---|---|---|
| 5,941,366 A * | 8/1999 | Quinlan | B65G 17/002 198/465.1 |
| 6,202,829 B1 | 3/2001 | van Dyke, Jr. et al. | |
| 6,531,095 B2 * | 3/2003 | Hammer | G01N 35/00029 356/244 |
| 6,805,294 B2 | 10/2004 | Itoh | |
| 8,915,421 B2 | 12/2014 | Lavi | |
| 8,973,736 B2 * | 3/2015 | Johns | B04B 7/08 198/439 |
| 2001/0019826 A1 * | 9/2001 | Ammann | C12Q 1/6834 435/6.11 |
| 2004/0084531 A1 | 5/2004 | Itoh | |
| 2008/0038827 A1 * | 2/2008 | Miller | G01N 35/04 436/43 |
| 2010/0012460 A1 | 1/2010 | Pedrazzini | |
| 2012/0028343 A1 * | 2/2012 | Kitagawa | G01N 35/00722 435/286.1 |
| 2012/0037696 A1 | 2/2012 | Lavi | |
| 2012/0114536 A1 | 5/2012 | Manian et al. | |
| 2013/0034410 A1 | 2/2013 | Heise et al. | |
| 2013/0065797 A1 * | 3/2013 | Silbert | G01N 35/0099 506/39 |
| 2013/0125675 A1 | 5/2013 | Mueller et al. | |
| 2014/0202829 A1 * | 7/2014 | Eberhardt | G01N 35/04 198/341.01 |
| 2014/0256050 A1 * | 9/2014 | Tanaka | G01N 35/026 436/47 |
| 2014/0374480 A1 | 12/2014 | Pollack | |
| 2015/0273468 A1 | 10/2015 | Croquette et al. | |
| 2015/0301072 A1 | 10/2015 | Gelbman | |
| 2017/0108522 A1 * | 4/2017 | Baer | G01N 35/00722 |
| 2017/0131310 A1 * | 5/2017 | Volz | G01N 35/04 |

FOREIGN PATENT DOCUMENTS

| | | |
|---|---|---|
| WO | 2011/138448 A1 | 11/2011 |
| WO | 2013/064656 A1 | 5/2013 |
| WO | 2014/016199 A1 | 1/2014 |

* cited by examiner

SAMPLE HANDLING DEVICE AND METHOD FOR SAMPLE HANDLING

CROSS-REFERENCE TO RELATED APPLICATIONS

This application is a continuation of PCT/EP2016/077472, filed Nov. 11, 2016, which is based on and claims priority to EP 15194227.3, filed Nov. 12, 2015, which are hereby incorporated by reference.

BACKGROUND

The present disclosure relates to a sample handling device, a sample identification device, a system for sample handling, a diagnostics device and a method for handling a sample in the field of automatic or semi-automatic diagnostics, such as in the field of high-throughput diagnostics.

In the field of laboratory diagnostics, specifically in the field of high throughput diagnostics using automatic or semi-automatic systems, there exists a need for high-throughput sample handling of samples such as biological specimens. Very often, the samples are provided in vessels and are transported successively or in parallel to the various handling or processing stations.

A major issue in sample handling is the issue of sample identification. Thus, there exists a need for tracking specific samples such as specific specimens and, moreover, the need for identifying samples present in a specific processing station, such as in an analytical station, of the system. For identifying vessels and/or samples, various techniques are known in the art. Thus, in many cases, vessels are provided with one or more identifiers, such as optical and/or electronic identifiers, specifically unique identifiers, which may be detected optically and/or electronically. For this purpose, as an example, bar codes may be used as optical identifiers and/or RFID tags as electronic identifiers. Reading information contained in the identifier by a reading station, however, in many cases requires orienting the vessel and/or the sample in a specific way, such as in a specific orientation towards a reader such as an optical barcode reader.

Despite the advantages implied by known devices and methods, some major technical challenges remain. Thus, generally, known devices and methods for providing a sample vessel and a dedicated and well-defined position and orientation generally are voluminous and expensive. Further, whenever a vessel rotation is required, a rotor and at least one element pressing the vessel against the rotor are typically needed. The use of a pressure element, however, requires additional space which typically is difficult to provide in compact handling systems. Further, the pressure element typically has to be mounted in a movable or pivotable way, such as in a slidable fashion, which requires additional drives and/or sensors.

Therefore, there is a need for a sample handling device, a sample identification device, a system for sample handling, a diagnostics device and a method for sample handling that require a low construction volume and which are implementable at low cost and which, still, are reliable and enable a high throughput handling of samples.

SUMMARY

According to the present disclosure, a sample handling device is presented. The sample handling device can comprise at least one magnetic positioning device configured for magnetically holding a carrier configured for carrying at least one vessel in the sample handling device and at least two rotors for rotating the carrier within the sample handling device. The magnetic positioning device can be configured to pull the carrier onto the rotors by magnetic force. The magnetic positioning device can be at least partially located in between the at least two rotors.

In accordance with one embodiment of the present disclosure, a sample identification device is presented. The sample identification device can comprise at least one of the above sample handling devices and at least one reader for reading at least one identifier attached to the vessel carried by the carrier.

In accordance with another embodiment of the present disclosure, a system for sample handling is presented. The system can comprise at least one of the above sample handling devices and at least one carrier for carrying at least one vessel.

In accordance with yet another embodiment of the present disclosure, a diagnostics device for identifying at least one property of a plurality of samples is presented. The diagnostics system can comprise at least one of the above systems and at least one analytical device configured for performing at least one analytical operation with the samples.

In accordance with still yet another embodiment of the present disclosure, a method for sample handling is presented. The method can comprise magnetically holding a carrier carrying at least one vessel having a sample disposed therein in an above sample handling device by using the at least one magnetic positioning device and pulling the carrier configured for carrying at least one vessel in the sample handling device onto the rotors by magnetic force using the magnetic positioning device.

Accordingly, it is a feature of the embodiments of the present disclosure to provide for a sample handling device, a sample identification device, a system for sample handling, a diagnostics device and a method for sample handling that require a low construction volume and which are implementable at low cost and which, still, are reliable and enable a high throughput handling of samples. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
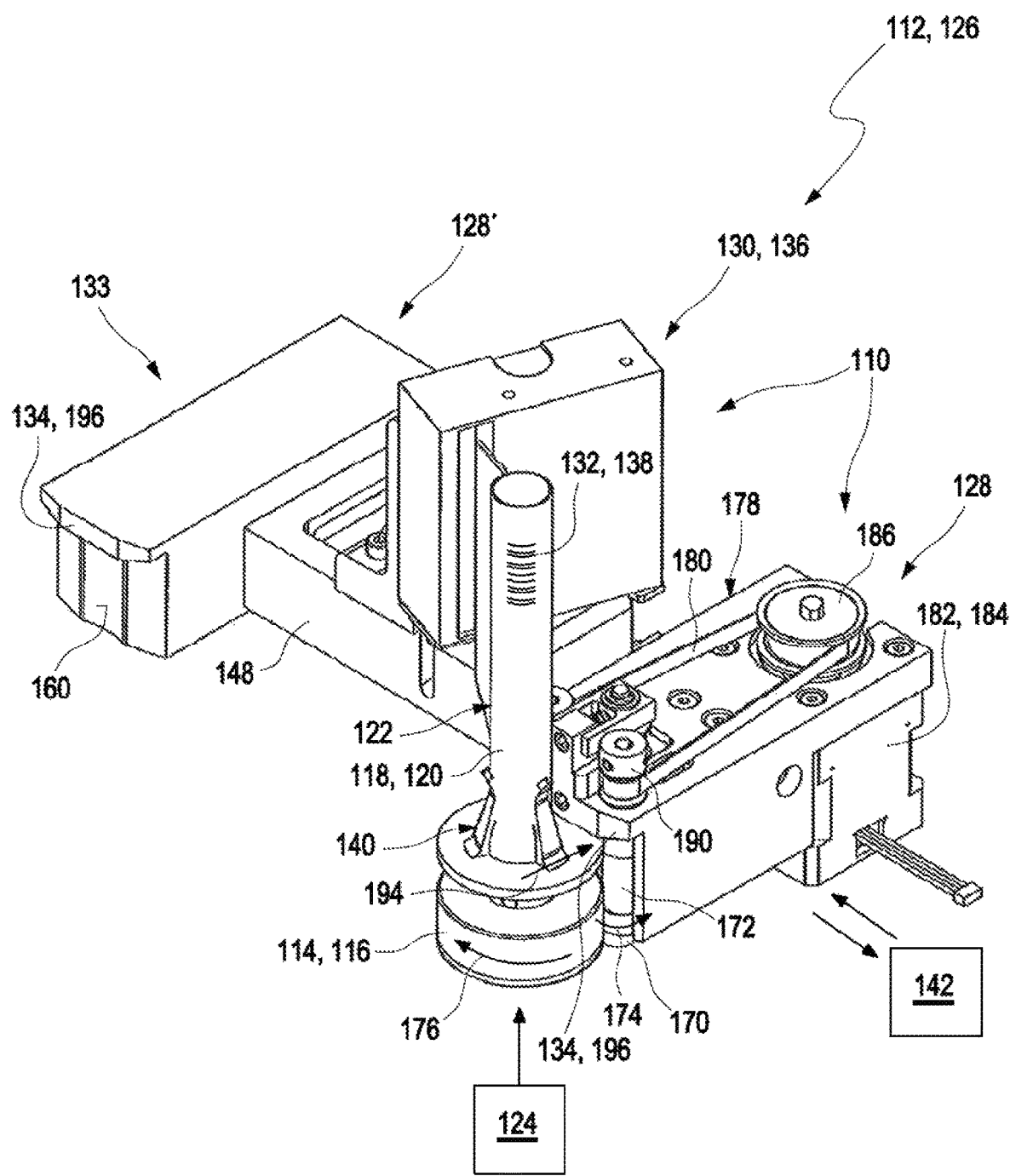
FIG. 1 illustrates a sample handling device and a sample identification device in a perspective view according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it can be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms can be used in conjunction with optional features, without restricting alternative possibilities. Thus, features introduced by these terms may be optional features and may not be intended to restrict the scope of the claims in any way. The present disclosure may, as the skilled person can recognize, be performed by using alternative features. Similarly, features introduced by "in an embodiment" or similar expressions can be intended to be optional features, without any restriction regarding alternative embodiments, without any restrictions regarding the scope and without any restriction regarding the possibility of combining the features introduced in such way with other optional or non-optional features.

A sample handling device is disclosed. As used herein, the term "sample handling device" can generally refer to a device which can be capable of handling and operating one or more samples simultaneously. Therein, the term "handle" can generally refer to the process of one or more of transporting, moving, positioning, orienting, rotating or operating the sample, the latter including e.g. the process of opening a vessel containing the sample. Therein and in the following, generally, no difference can be made between the vessel containing the sample and the sample itself. Thus, when referring to "handling a sample", the process of handling a vessel containing the sample can be implied by this term. The carrier carrying the vessel may also be part of the sample handling device, or the sample handling device may simply be configured for handling the carrier.

A sample identification device is disclosed which can comprise at least one sample handling device according to the present disclosure and which, further, can comprise at least one reader, as will be explained in further detail below. As used herein, a "sample identification device" can generally refer to a device which can be capable of identifying at least one object. As used therein, the term "identifying" can generally refer to the process of recognizing one or more of the identity of an object, the nature of an object, a number of an object, a unique information assigned to the object or any other information relating to the object which characterizes or identifies the object. As an example, identifying an object may include reading a number attached or assigned to the object which can uniquely identify the object or characterize the object. Thus, an entity of objects may be provided, each having a unique identifier, wherein the process of identifying the object can imply reading the unique identifier. As further used herein and in the following, an "identifier" can generally refer to an information carrier which can be capable of carrying information that uniquely identifies an object to which the identifier can be attached or assigned. As an example and as will be outlined in further detail below, the identifier specifically may be an identifier which is contactlessly readable, such as an optical identifier and/or a contactless electronic identifier. As an example, the identifier may comprise a one-dimensional, a two-dimensional or even a three-dimensional barcode. Additionally, or alternatively, the at least one identifier may comprise at least one radio frequency identification device (RFID). Other examples are possible.

The sample handling device and the sample identification device specifically may be used in high-throughput diagnostics, such as in a high-throughput diagnostics device. The sample handling device and the sample identification device as proposed in the present invention may simply and easily be implemented in one or more of these systems.

The sample handling device can comprise at least one magnetic positioning device for magnetically holding a carrier in the sample handling device. The carrier may be configured for carrying the at least one vessel. Therein, a magnetic positioning device can generally refer to a device which can be capable of one or more of holding, positioning, orienting or rotating an object by exerting magnetic forces onto the object. The term "holding" can generally refer to the process of maintaining a position of the carrier or bringing the carrier in a predetermined position or into a sequence of positions, wherein, when held in the predetermined position, the object may also be handled or rotated. Thus, specifically, the process of holding specifically may imply the process of keeping a predetermined position of the carrier, with the option of rotating the carrier in this predetermined position.

As further used herein, the term "magnetically holding" can generally refer to the process of holding by using one or more magnetic forces. Specifically, magnetically holding may imply exerting one or more attractive forces onto an object which is magnetically held.

As further used herein, the term "carrier" can generally refer to a device which can be capable of supporting or mounting one or more objects thereto, in order to move and/or orient these objects in a predetermined fashion. As will be outlined in further detail below, the carrier, as an example, may comprise a carrier body and at least one receptacle attached and/or integrated into the carrier body. The carrier, as an example, may have a rotational symmetry. Thus, as an example, the carrier specifically may be or may comprise a rotationally symmetric disc. Carriers of this type, in the literature, often are referred to as "pucks". The puck, as an example, may have a concentric receptacle, such as a concentric drill hole or bore, or a concentric receptacle protruding from the disc in an axial direction. As will also be outlined in further detail below, the carrier specifically may be made of one or more magnetic materials, i.e. of one or more materials which can be capable of being attracted by a magnet such as the magnetic positioning device.

As further used herein, a vessel can generally refer to an arbitrary container which can be capable of receiving one or more samples, such as one or more biological specimens and/or one or more liquid samples.

As outlined above, verbally, in many cases, no difference can be made between the sample itself and the vessel containing the sample. Thus, specifically, in the following, whenever reference is made to the sample, optionally, the sample may be contained in a vessel. The vessel specifically may be made of a transparent material, specifically a rigid transparent material. As an example, a glass vessel and/or transparent plastic vessels may be used. It can be noted, however, that other types of vessels are also usable. The vessel specifically may be a rotationally symmetric vessel, such as a tube. Thus, in the following, without restricting the option of using other types of vessels, the vessel is often also referred to as a "tube".

The sample identification device can further comprise at least one reader for reading at least one identifier attached to the vessel carried by the carrier. As used herein, a "reader" can generally refer to a device which can be capable of detecting and/or reading at least one item of information contained in the identifier, according to the definition given above. The reader may detect the information and, optionally, may also fully or partially process the information, such as by decoding at least one secondary information contained therein. As an example, the information may be encoded, and the process of reading the information may imply decoding the information. Thus, the process of reading the identifier may imply the process of generating at least one item of secondary information on the identity of the sample and/or of the vessel. The reader specifically may be a reader for contactles sly reading information, such as an optical reader, e.g. a barcode reader, more preferably a barcode scanner, such as a line-scanner. Additionally, or alternatively, however, the reader may also imply other types of readers, such as RFID readers.

The at least one identifier can be attached to the vessel carried by the carrier. The carrier carrying the vessel may also be part of the sample identification device. Therein, the term "attached" generally may refer to an arbitrary way of locally assigning the identifier to the vessel. Thus, as an example, the identifier may be attached to an outer or inner surface of the vessel. Additionally, or alternatively, however, the identifier may also fully or partially be integrated into the vessel, such as into at least one wall of the vessel. The identifier also may be part of the vessel itself, such as by using random structures of the vessel as a unique identifier, e.g. bubbles within a vessel wall or the like. Other ways of locally assigning the identifier to the vessel are generally possible.

The sample handling device and/or the sample identification device may further comprise at least one controller. As used herein, the term "controller" can generally refer to an arbitrary device which can be configured to control an operation of a system. Therein, the term "controlling" can generally refer to an arbitrary process of influencing or regulating a process in a defined or definable fashion. As an example, the controller may be adapted to fully or partially influence a sequence of operating steps in the sample identification device. Controllers generally are known in the art of electronics. The controller specifically may comprise at least one computer, at least one processor or at least one integrated circuit for running the controlling process. As an example, at least one microcontroller or microcomputer may be comprised, and/or at least one application-specific circuit (ASIC). The controller specifically may be configured to run one or more software components thereon, and, thus, may be configured for software programming, as will be outlined in further detail below. Thus, the sample handling device, the sample identification device and/or the method for sample handling, which will be explained in further detail below, may fully or partially be software-supported, by using at least one computer program as will be outlined in further detail below. The sample handling device and the sample identification device each may comprise independent controllers, or at least one controller may at least partially be used both for the sample handling device and the sample identification device.

The controller comprised by the sample identification device may be configured to control the sample handling device and/or the sample identification device such that the identifier attached to the vessel carried by the carrier in the sample handling device can be detectable by the reader, preferably visible by the reader. Thus, as an example, the controller may be configured to control the sample handling device in such a way that the vessel carried by the carrier can be oriented and/or turned or rotated in a specific way, such that the at least one identifier attached to the vessel can be readable by the reader. As an example, the at least one barcode may be brought into a field of view of a barcode reader, such as into the field of view of a barcode line-scanner. Generally, the orientation may be a permanent orientation, such that the vessel remains in a predetermined orientation, or the orientation may comprise a rotation.

The reader specifically may be configured for reading at least one contactless identifier, as outlined above. As an example, the reader specifically may be configured as a barcode reader and/or as an RFID tag reader.

The reader specifically may comprise at least one optical reader. As an example, the reader may comprise at least one barcode reader. The optical reader, as an example, may be a scanner or may comprise a scanner, such as a two-dimensional scanner or a line-scanner. As an example, the optical reader may be or may comprise at least one line-scanner, preferably a line-scanner configured to scan a line parallel to a rotation axis of the carrier in the sample handling device. Thus, as will be outlined in further detail below, the sample handling device may comprise at least one rotor for rotating the carrier and/or the vessel contained in the carrier in a predetermined way, such as about a rotation axis. As an example, the rotation axis may be parallel to an axis of the vessel, preferably in case the vessel is a rotationally symmetrical vessel. As an example, the at least one rotor may be configured to rotate the disc-shaped carrier or puck about an axis of the puck, such that, e.g., a tube located in the carrier, e.g. received in a receptacle of the carrier, can be rotated about a rotational axis of the tube. The optional line scanner of the reader specifically may be configured to scan at least one line substantially parallel to the rotation axis of the carrier in the sample handling device, e.g., substantially parallel to an axis of symmetry of the vessel, such as an axis of symmetry of the tube.

The sample handling device may further comprise at least one rotor for rotating the carrier within the sample handling device. As used herein, the term "rotor" can generally refer to an arbitrary device which can be configured for inducing a rotational motion about at least one rotational axis or axle of an object. As an example, the rotor may comprise one or more of a wheel, a rotating cylinder, a rotating axle, a rotating roller, a rotating drum, a rotating barrel, a belt, a chain or the like. Combinations of the named devices and/or other devices can be feasible. Specifically, the rotor may comprise at least one rotational symmetric element which can be capable of being driven in a rotational fashion, such as by at least one motor.

The magnetic positioning device specifically may be configured to pull the carrier onto the rotor by magnetic force. Thus, specifically, the magnetic positioning device may comprise at least one pulling magnet, such as at least one pulling electromagnet, which is explained in further detail below. The magnetic positioning device specifically may pull the carrier onto the rotor, such that a rotational movement of the rotor can be transferred onto the carrier and, thus, onto the vessel contained in the carrier. Consequently, by the magnetic positioning device, not only may be the carrier be fixedly held in the sample handling device, but the carrier may also be pulled against the rotor in order to be rotated and/or re-oriented by the rotor. Thus, the sample orientation in the sample handling device may take place by a combined action of the magnetic positioning device and the at least one rotor, with the magnetic positioning device pulling the carrier onto the rotor. As an example, the rotor may comprise an outer surface, such as a circumferential surface, which can perform a rotational movement, and the magnetic positioning device may be configured to pull the carrier onto the rotor such that an outer surface of the carrier, such as an outer circumferential surface of the carrier, can be pulled onto the outer circumferential surface of the rotor. Thereby, the movement of the circumferential surface of the rotor can be transferred onto the circumferential surface of the carrier, and, thus, onto the carrier itself. As outlined above, the orientation of the sample may be an orientation by bringing the carrier and/or the vessel located therein in a predetermined orientation, wherein the carrier and/or the vessel remained in the predetermined orientation, or the orientation may comprise a rotation, such that the carrier and/or the vessel therein are rotated.

The sample handling device may contain one or more rotors. Specifically, the sample handling device may comprise at least two rotors. The rotors specifically may be oriented such that the rotational axes of the at least two rotors are oriented essentially parallel to a rotational axis of the carrier and/or of the vessel. Thus, the at least two rotors, with their circumferential surfaces, may engage a circumferential surface of the carrier at two different points. One or both of the rotors may be driven.

As will be outlined in further detail below, the rotors, in conjunction with the magnetic positioning device, may form a abutment surface into which the carrier, specifically the puck, specifically the round carrier, may at least partially engage such that the abutment surface partially surrounds the carrier and, thus, positions the carrier. By exerting a magnetic pulling force, the carrier may be pulled onto the abutment surface.

The at least one rotor generally may comprise at least one rotor shaft and at least one rubberization. Thus, the at least one rotor shaft may fully or partially be rubberized. As used herein, the term "rubberize" can generally refer to the action of applying at least one sticky or non-slippery element or surface to another element. As an example, one or more rubber bands and/or one or more rubber rings or O-rings may be attached around the rotor shaft in a circumferential fashion.

The at least one rotor may specifically be driven by at least one motor. Therein, in case a plurality of rotors is provided, one or more or even all of the rotors may be driven. As an example, in the case of a plurality of the rotors is driven, the driving of the rotors may take place in a synchronized fashion, such as by using one and the same motor for driving the plurality of rotors. The at least one motor specifically may comprise at least one step motor. The at least one motor may drive the at least one rotor by using at least one gear and/or at least one drive. As an example, the at least one motor may be connected to the at least one rotor via at least one driving belt and/or via at least one other pulling means, such as via at least one chain. Other drives, however, are implementable additionally or alternatively. In the case of at least one pulling means is used for driving the rotor, the at least one pulling means, such as the at least one belt and/or the at least one chain, may be tensioned by at least one tensioning device such as at least one belt-tensioning device and/or at least one chain-tensioning device, wherein the tensioning device specifically may be part of the sample handling device and/or the sample identification device.

The sample handling device, which may also be referred to as or may be embodied as a sample orientation device, and/or the sample identification device, each may contain further elements or further devices. Thus, as an example, the handling device may further comprise at least one holding-down device for holding down the carrier. As used herein, the term "holding-down device" can generally refer to an arbitrary element or device which is capable of holding the carrier in a predetermined flat position, such as for holding the carrier on a supporting surface or a supporting belt. For this purpose, the holding-down device may comprise at least one holding-down element, such as at least one holding-down surface, a holding-down abutment element or a holding-down lever. Other exemplary embodiments are generally feasible. The holding down device may also be implemented independently in the system for sample handling which will be outlined in further detail below, independent from the sample handling device and/or the sample identification device. Thus, whenever the carrier has to be held down in a flat position, such as for inserting a vessel into an empty carrier and/or for taking a vessel from a carrier, the holding down device may be used. Thus, as an example, the holding down device generally may comprise an edge which is located partially on top of the carrier such that the carrier cannot lift or raise.

The magnetic positioning device, as mentioned above, specifically may be electrically switchable. Thus, as an example, the magnetic positioning device specifically may comprise at least one electromagnet. As used herein, the term "electromagnet" can generally refer to a magnet which can be based on magnetism induced by one or more electric currents. Specifically, the electromagnet may comprise at least one electromagnet coil and, optionally, one or more cores, specifically cores made of a magnetic material such as a soft magnetic material and/or a ferromagnetic material fully or partially penetrating the at least one coil.

Specifically, the electromagnet, besides the at least one coil, may comprise at least one core. As generally used herein, a "core", as usual in the field of electromagnets, generally refers to a magnetic element, such as an element fully or partially made of a soft magnetic material and/or a ferromagnetic material, which can be fully or partially inserted into a coil or solenoid of the electromagnet. The core, generally, may have an arbitrary shape, as will be outlined in further detail below. Thus, in the simplest case, the core simply may be or may comprise an elongated, straight core, such as a bar, wherein the coil can be fully or partially wound around the core. The core may be fixedly positioned within the coil or may fully or partially be movable. Alternatively, the core also may provide a different shape. Thus, as will be also outlined in further detail below, E-shaped cores and/or U-shaped cores may be used. Further, the core, with the at least one coil disposed thereon, generally may be configured to provide a closed loop of the magnetic field, wherein one or more gaps may be present in the core. The core may provide the closed loop of the magnetic field in an isolated fashion or in conjunction with the at least one carrier, which also may fully or partially be made of a soft magnetic material and/or a ferromagnetic material. Thus, as an example, as will be outlined in further detail below, the ends of a bent core may point towards the carrier, and the carrier may interconnect two or more of these ends, thereby providing a closed loop of the magnetic field. As an example for soft magnetic materials which may be used as core materials and/or as carrier materials, iron may be named. Other soft magnetic materials, however, are feasible.

The core, as outlined above, specifically may be a bent core, forming two or more arms. At least one coil of the electromagnet may be disposed on at least one of the arms and/or, specifically in case of an E-shaped core and/or in case of a U-shaped core, on a backbone of the core. Specifically, the core may have at least two arms, wherein at least two of the arms can have ends pointing towards the carrier in the sample handling device. Thus, as outlined above, the carrier may magnetically interconnect the at least two arms, preferably with a slight gap in between, and, thus, may close the magnetic loop. As an example, the ends may point towards the carrier such that an air gap between each end and the carrier in the sample handling device is smaller than 10 mm in one embodiment and even smaller than 5 mm, e.g. 0.5 mm to 5 mm, in another embodiment.

As outlined above, this closed loop may be realized in various geometries. As an example, the core may comprise at least one E-shaped core or may be an I-shaped core, with a middle arm of the core pointing towards the carrier in the sample handling device and with two outer arms on opposing sides of the middle arm also pointing towards the carrier in the sample handling device.

Additionally, or alternatively, the core may be or may comprise at least one U-shaped core, wherein two ends of the U-shaped core, such as the ends of the two arms of the U, point towards the carrier in the sample handling device. The at least one coil of the electromagnet, in this case, may, e.g., be disposed on a backbone of the U-shaped core and/or on one or both of the arms. Various geometries are generally feasible.

As outlined above, the core specifically may be designed to provide a closed magnetic loop. Therein, one or more further elements may interact with the core, in order to provide the closed magnetic loop. As outlined above, the sample carrier itself may take part in the magnetic loop, in order to interconnect two or more arms or ends of the core magnetically. Additionally, or alternatively, the above-mentioned rotors of the sample identification device may fully or partially take part in the magnetic loop and may further assist in closing the magnetic loop. Thus, as outlined above, the at least one sample identification device may have at least one rotor. The at least one rotor may fully or partially be located in between at least one end of the core and the carrier in the sample handling device. The rotor may fully or partially be made of a magnetic material, such as of a soft magnetic material and/or of a ferromagnetic material. As an example, again, iron may be used. Alternatively, however, the rotor may fully or partially be made of a non-magnetic material, such as nonmagnetic stainless steel or aluminum. The latter may be preferred in order to allow for a quicker release or quicker switching off of the magnetic force. Other materials, however, are also feasible.

A system for sample handling is disclosed. The system can comprise at least one sample handling device according to the present disclosure, such as according to any one of the above-mentioned embodiments and/or according to any one of the embodiments disclosed in further detail below. The sample handling device comprised by the system may be part of a sample identification device which may be part of the system. Additionally, or alternatively, however, the system may comprise one or more sample handling devices which are not part of a sample identification device and which can be used for different purposes. Thus, as an example, one or more sample handling devices may be provided in a station of the system in which the vessels can be taken out of the carriers and transferred into a storage position, such as transferred into one or more vessel racks. The sample handling device, in this embodiment, specifically may be used for orienting the vessels in a predetermined fashion, such that the vessels, in the rack, can be oriented in a predetermined way, such as with their bar codes and/or identifiers to the front. Other embodiments, however, are feasible.

The system can further comprise at least one carrier for carrying at least one vessel. For further details of the sample handling device, the sample identification device and the carrier and/or the vessel, reference may be made to the disclosure given above.

As outlined above, the carrier may fully or partially be made of a magnetic material. The carrier may fully or partially be made of one or more of at least one magnetically soft material or at least one ferromagnetic material. Again, as an example, a magnetic iron material may be iron. The carrier, specifically, may have a rotational symmetry. Thus, as an example and as outlined above, the carrier specifically may be a rotationally symmetric disc, such as a puck. The carrier generally may comprise at least one receptacle for receiving the vessel. For further details and optional embodiments of the receptacle, reference may be made to the disclosure given above.

The system further may comprise at least one vessel received in the receptacle. For optional embodiments of the vessel, reference may be made to one or more of the embodiments given above. Specifically, the vessel may be or may comprise at least one tube. The vessel may protrude from the receptacle on an upper side of the carrier. As used herein, the term "upper side" can generally refer to a reverse direction as compared to the gravitational force acting on the carrier in a normal use of the carrier. Thus, as an example, the carrier may have an underside, such as a flat underside, and an upper side, with the at least one receptacle disposed on the upper side, such that the vessel can protrude from the carrier on the upper side.

The system may further comprise at least one transportation device for transporting a plurality of the carriers. Thus, as an example, the transportation device may be adapted to, subsequently and/or in parallel, transport a plurality of the carriers, with one or more vessels disposed in each of the carriers, between a number of stations of the system. Thus, as an example, the system may comprise various stations such as analytical stations, preparation stations, evaluation stations, measurement stations, storage stations or the like. Thus, the above-mentioned sample handling device and/or sample identification device may be used as one or, in case a plurality of these sample handling devices and/or of these identification devices is provided, a plurality of stations of the system. Thus, as outlined above, the system may comprise at least one sample identification device having the at least one sample handling device and, optionally, may further comprise at least one sample handling device which is not part of a sample identification device and which is used for other purposes.

The transportation device, as an example, may provide a belt-shaped transportation device and/or another type of transportation device with one or more actors configured to transport the carriers, e.g. by moving the carriers around and/or by turning the carriers. As an example, which may be used additionally or alternatively, the transportation device may also provide a magnetic transportation device, configured for magnetically transporting the carriers. The transportation device may be designed to be operated and/or controlled by the above-mentioned optional at least one controller.

A diagnostics device for identifying at least one property of a plurality of samples is disclosed. As generally used herein, the term "diagnostics device" can generally refer to a device which is capable of performing at least one diagnostic operation, specifically an in-vitro-diagnostic operation. The diagnostics device can be adapted for identifying at least one property of a plurality of samples. Specifically, at least one property may be detected and/or measured for each of the samples. The term "property", in the context of the diagnostics device, can generally refer to an arbitrary property of the sample which may be measured, such as physically, chemically, or biologically. As an example, the at least one property may be or may comprise at least one electrically measurable property, at least one optically measurable property, at least one color, at least one transparency, at least one index of refraction or the like. Further, the at least one property may be or may comprise the content and/or the concentration of at least one ingredient to be detected, such as of at least one analyte to be detected. The diagnostics device, for identifying the at least one property, may comprise at least one measurement device, which can be configured to perform the at least one diagnostic operation.

The diagnostics system can comprise at least one system according to the present disclosure, such as according to one or more of the above-mentioned embodiments and/or according to one or more of the embodiments disclosed in further detail below. Thus, the diagnostics system can comprise at least one sample handling device according to the present disclosure and at least one carrier. As outlined above, the at least one sample handling device comprised by the diagnostics system may be part of at least one sample identification device which may be part of the diagnostics system. Additionally, or alternatively, however, the diagnostics system may also comprise at least one sample handling device which may not be part of a sample identification device. The diagnostics device can further comprise at least one analytical device configured for performing at least one analytical operation with the samples. As an example, the analytical device may be adapted for detecting the presence and/or the concentration of at least one analyte in the sample, specifically in each of the samples.

A method for handling a sample is disclosed. The method specifically may make use of one or more of the sample handling device, the sample identification device, the system or the diagnostics device of the present disclosure, such as according to one or more of the embodiments disclosed above and/or according to one or more of the embodiments disclosed in further detail below. The method specifically may be used in a high-throughput diagnostics device. The method can comprise the method steps discussed in the following. Therein, the method steps may be performed in the given order. However, a different order is also feasible. Further, it is also feasible to perform each of the method steps only once or in a repeated fashion. Further, two or more of the method steps may be performed repeatedly. Further, the method may comprise additional method steps, which are not listed herein. Further, two or more of the method steps may fully or partially be performed simultaneously or in a timely overlapping fashion.

The method can comprise at least magnetically holding a carrier carrying at least one vessel having a sample disposed therein in a sample handling device by using at least one magnetic positioning device.

The method may further comprise reading at least one identifier attached to the vessel carried by the carrier by using at least one reader.

In the latter case, the method for sample handling may also fully or partially be embodied as a method for identifying a sample and/or may comprise one or more steps of identifying the sample.

For further details and optional embodiments of the method, reference may be made to the disclosure of the sample identification device given above.

The method may further comprise orienting the carrier within the sample handling device by using at least one rotor. As discussed above, the orientation may imply bringing the carrier into a predetermined orientation. Additionally, or alternatively, however, the orientation may also imply a rotation of the carrier. Specifically, orienting the carrier may comprise orienting the identifier attached to the vessel carried by the carrier. As an example, the method may comprise transporting the carrier to the sample handling device, rotating the carrier within the sample handling device by using the rotor, until the identifier is readable, preferably visible, by the reader, and, finally, reading the identifier. The reading may take place when the carrier stands still or even during rotation of the carrier. Thus, in this case of a barcode being used with lines of the barcode being oriented in a circumferential fashion, the scanning may take place during orientation, which can increase the speed of the sample identification.

The above-mentioned devices and methods may be improved and embodied in various ways. Thus, as outlined above, the vessels specifically may be tubes having a barcode thereon, such as a one-dimensional barcode with simple bars. The barcode, as an example, may have to be identified during and/or after transportation of the tubes. For this purpose, by using the present disclosure, the tubes may have to be oriented in the appropriate way. Generally, after reading the at least one identifier attached to the vessel carried by the carrier by using the at least one reader, one or more additional steps may follow. Thus, as an example, the method may be performed such that or the sample identification device may be designed such that, after reading, the carrier within the sample handling device is oriented in a second, predetermined orientation, which may be identical to a reading orientation or which may be different from a reading orientation. Thus, as an example, after reading the identifier, the carrier may be re-oriented by the at least one rotor, such that the at least one identifier faces into a specific, predetermined direction. This may be used for transferring the at least one vessel to another station of the system, such as the above-mentioned analytical device, in a predetermined orientation. Further, specifically in the analytical device, the diagnostics device and/or the method may be embodied such that the at least one vessel is taken from the at least one carrier, such as by removing the at least one tube from the puck. The above-mentioned holding-down device may be designed in this way. Thus, generally, the at least one holding-down device of the sample identification device may be configured for holding down the carrier during taking out the at least one vessel from the carrier. Specifically, the sample handling device, the sample identification device and/or the system and/or the at least one diagnostics device may comprise at least one automatic removal system for removing the at least one vessel from the carrier. As an example, a robot or robot arm may be used for removing the at least one vessel from the carrier, specifically when the carrier is in the holding-down device of the sample identification device. By the above-mentioned re-orientation process, the sample identification device specifically may be designed such that the at least one identifier, when the carrier is in the holding-down device, is oriented in a predetermined way. Thus, when the vessel is taken out from the carrier, the identifier of the vessel may face into a predetermined direction, in order to e.g. provide the identifier information to another reader and/or in order to be out of the way for other analytical purposes such as optical measurements. As an example, as discussed above, the vessel may be taken out from the carrier in a predetermined orientation and may be inserted into a vessel rack with a predetermined orientation.

The vessels, specifically the tubes, generally may be disposed in single-holder carriers, i.e., in one or more carriers which are capable of receiving precisely one of the vessels, each. Thereby, the orientation of the carrier may determine the orientation of the vessel disposed therein.

Specifically, in the sample handling device, the at least one carrier may be located closely to the magnetic positioning device and/or to the at least one optional roller. Thus, the sample handling device may provide additional guidance to at least one carrier into the sample handling device. As an example, one or more guide rails and/or one or more inclinations may be provided in a housing and/or in other parts of the sample handling device. Thus, as an example, the at least one core of the electromagnet itself may provide inclinations or guide elements for guiding the at least one carrier in the correct position. Further, the at least one carrier may be inserted into the at least one sample handling device in a direct fashion, such as from a front side.

Thus, as discussed above, the sample handling device may comprise at least one abutment surface into which the carrier such as, the puck, may partially engaged such that the abutment surface partially surrounds the carrier and, thus, positions the carrier. As used herein, the term "abutment surface" can generally refer to an arbitrary surface or combination of surfaces of the sample handling device which can be capable of engaging with the carrier in order to position the carrier, such as to position the carrier relative to a position of the sample handling device. Thus, the positioning of the carrier may be a combination of a magnetic holding force exerted by the magnetic positioning device and, optionally and additionally, of a mechanical guiding or even a mechanical holding effect exerted by the abutment surface.

The abutment surface specifically may be a non-flat abutment surface, such as a surface comprising a plurality of surface sections which can be arranged in an angle fashion, or such as a curved abutment surface. Other examples of non-flat abutment surfaces are possible and may be implemented in the present disclosure, as an example, a rectangular or star-shaped circumferential surface of the carrier and, correspondingly, an appropriate and corresponding shape of the abutment surface. Generally, the abutment surface may at least partially fit with an outer shape of the carrier.

The abutment surface and the carrier specifically may be configured such that a form-fit connection between the abutment surface and the carrier may be established. The carrier may be forced onto the abutment surface by magnetic forces exerted by the magnetic positioning device.

As outlined above, the magnetic positioning device and, optionally, the one, two or more rotors may form part of the abutment surface. Further, the above-mentioned guidance of the carrier into the sample handling device may also form part of the abutment surface. Specifically, the abutment surface may have a curvature or a non-flat shape which at least substantially resembles the outer curvature of the carrier, such that, when the carrier is partially inserted into the sample handling device and when the carrier engages with the abutment surface, a distance between the surface of the carrier and the abutment surface can be substantially constant over the abutment surface. As used therein, the term "essentially" generally may include that the distance between the surface of the carrier and the abutment surface, over the abutment surface, thus not vary by more than a factor of 5, preferably by no more than a factor of 4, by no more than a factor of 3 or by no more than a factor of 2.

Therein, in case a plurality of elements of the sample handling device can form part of the abutment surface, not all of these elements necessarily have to provide a full surface or a full surface contribution to the abutment surface. Thus, as an example, for the rotors, line-shaped vertical elements may be contributed to the abutment surface, since, as an example, a contact of a round carrier with a round rotor generally is a line. Thus, the abutment surface in this embodiment or other embodiments may be a combined surface having a plurality of elements which may be interconnected or which may be isolated and which all, in total, summarize to the above-mentioned effect of positioning the carrier.

Preferably, when the carrier is held by the sample handling device, the carrier preferably can be held in a predetermined position with a predetermined accuracy, such as with an accuracy of less than 0.5 mm of misalignment. Specifically, when the sample handling device is used for handing over the vessel, such as by a robot, a gripper or another type of transfer system taking out the vessel from the carrier in the predetermined position, specifically in an analyzer system and/or analyzer device, the accuracy typically can be better than 0.5 millimeters.

As outlined above, the at least one carrier may fully or partially be made of a magnetic material. Therein, the full carrier may be made of the magnetic material, or only a part of the carrier. Thus, as an example, the at least one carrier, such as the at least one puck, may comprise at least one coating made of the at least one magnetic material. As an example, as outlined above, the at least one carrier may be rotationally symmetric, such as in the form of a circular disc. As an example, a cylinder shell of the carrier may fully or partially be made of the magnetic material.

As outlined above, by the magnetic force, the carrier, such as the puck, may be pulled onto two or more vertical rotors, such as onto two or more vertical axles. These axles, as an example, may simply be driven via a belt drive. Generally, in this embodiment or other embodiments, the at least one rotor may be designed to drive a rotational movement of the at least one carrier, such as of the at least one puck, by frictional force. Consequently, the at least one carrier can start turning about its own vertical axis.

The devices and methods, outlined above, may be used for orienting the at least one identifier, such as the at least one barcode, by appropriate orientation of the carrier and, thus, of the vessel wherein a scanning or, generally, a reading of the at least one identifier may take place during the rotation. Thus, a scanning of the barcode on a tube may take place during a rotation. Once the barcode or, generally, the identifier, is detected, the carrier may be rotated further, until the identifier points towards a desired orientation. Subsequently, the vessel, such as the tube, may be taken out of the carrier, such as of the puck, in order to be placed. For this purpose, as outlined above, the sample handling device may provide the at least one holding-down device.

Thus, the sample handling device, the sample identification, as well as the system, the diagnostics device and the method, provide a technically simple way of sample handling, sample identification and/or sample orientation. The identification and/or orientation may take place at a high speed, and, thus, may easily be integrated into high-throughput systems. Further, due to the fact that no pushing or pressing element is required for pressing the carrier and/or the vessel onto a rotating element, the overall construction volume of the devices and systems may be reduced as compared to conventional devices and systems. Further, the number of parts required for implementing the general idea is reduced over conventional devices and methods and, thus, the costs of the system generally may be reduced.

As outlined above, the present disclosure may fully or partially be embodied in a computer-controlled fashion. Specifically, as also outlined above, the at least one controller may be designed to implement one or more software functions. As an example, the rotational movement and/or the control of a step-motor for driving the at least one rotor may be computer-controlled.

Consequently, the present disclosure can further disclose and propose a computer program including computer-executable instructions for performing the method according to one or more of the embodiments disclosed herein when the program is executed on a computer or computer network. Specifically, the computer program may be stored on a computer-readable data carrier. Thus, specifically, one, more than one or even all of the method steps as indicated above may be performed by using a computer or a computer network, preferably by using a computer program.

The present disclosure can further disclose and propose a computer program product having a program code, in order to perform the method according to one or more of the embodiments disclosed herein when the program is executed on a computer or computer network. Specifically, the program code may be stored on a computer-readable data carrier.

Further, the present disclosure can disclose and propose a data carrier having a data structure stored thereon, which, after loading into a computer or computer network, such as into a working memory or main memory of the computer or computer network, may execute the method according to one or more of the embodiments disclosed herein.

The present disclosure can further propose and disclose a computer program product with a program code stored on a machine-readable carrier, in order to perform the method according to one or more of the embodiments disclosed herein, when the program is executed on a computer or computer network. As used herein, a computer program product can refer to the program as a tradable product. The product may generally exist in an arbitrary format, such as in a paper format, or on a computer-readable data carrier. Specifically, the computer program product may be distributed over a data network.

Finally, the present disclosure can propose and disclose a modulated data signal which can contain instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the present present disclosure can further disclose:

A computer or computer network comprising at least one processor, wherein the processor can be adapted to perform the method according to one of the embodiments described in this description, A computer-loadable data structure that can be adapted to perform the method according to one of the embodiments described in this description while the data structure is being executed on a computer, a computer program, wherein the computer program can be adapted to perform the method according to one of the embodiments described in this description while the program is being executed on a computer, a computer program comprising a program for performing the method according to one of the embodiments described in this description while the computer program is being executed on a computer or on a computer network, a computer program comprising a program according to the preceding embodiment, wherein the program can be stored on a storage medium readable to a computer, a storage medium, wherein a data structure can be stored on the storage medium and wherein the data structure can be adapted to perform the method according to one of the embodiments described in this description after having been loaded into a main and/or working storage of a computer or of a computer network, and a computer program product having a program code, wherein the program code can be stored or are stored on a storage medium, for performing the method according to one of the embodiments described in this description, if the program code can be executed on a computer or on a computer network.

A sample handling device, specifically for use in a high-throughput diagnostics device is presented. The sample handling station can comprise at least one magnetic positioning device for magnetically holding a carrier in the sample handling device, the carrier being configured for carrying at least one vessel.

The sample handling device can further comprise at least one rotor for rotating the carrier within the sample handling device. The magnetic positioning device can be configured to pull the carrier onto the rotor by magnetic force. The magnetic positioning device can be at least partially located in between the at least two rotors. The at least one rotor can comprise at least one rotor shaft and at least one rubberization. The at least one rotor can be driven by at least one motor such as, for example, by at least one step motor and, in one embodiment, by at least one motor connected to the at least one rotor via at least one driving belt.

The sample handling device can further comprise at least one holding-down device for holding down the carrier.

The magnetic positioning device can comprise at least one electromagnet. The electromagnet can comprise at least one core and at least one coil disposed on the core. The core can have at least two arms. At least two of the arms can have ends pointing towards the carrier in the sample handling device. In one embodiment, the core can comprise an E-shaped core, with a middle arm of the core pointing towards the carrier in the sample handling device, and with two outer arms on opposing sides of the middle arm also pointing towards the carrier in the sample handling device. In another embodiment, the core can comprise a U-shaped core, with two ends of the U-shaped core pointing towards the carrier in the sample handling device, and with at least one coil of the electromagnet disposed on a backbone of the U-shaped core.

The at least one rotor of the sample identification device can be fully or partially located in between at least one end of the core and the carrier in the sample handling device. The rotor can be fully or partially made of a magnetic material.

The sample handling device can further comprise at least one abutment surface into which a carrier may engage such that the abutment surface partially surrounds the carrier and positions the carrier.

A sample identification device can comprise at least one of the above sample handling device and at least one reader for reading at least one identifier attached to the vessel carried by the carrier.

The sample identification device can further comprise at least one controller. The controller can be configured to control the sample handling device such that the identifier attached to the vessel carried by the carrier in the sample handling device can be detectable by the reader such as, for example, visible by the reader. The reader can be a reader for reading at least one contactless identifier such as, for example, at least one an RFID tag or a barcode. The reader can comprise at least one optical reader such as, for example, at least one barcode reader. The optical reader can be a line-scanner such as, for example, a line-scanner configured to scan a line parallel to a rotation axis of the carrier in the sample handling device.

A system for sample handling can comprise at least one of the above sample handling device and at least one carrier for carrying at least one vessel. The sample handling device can comprise at least one abutment surface which can be configured to engage with at least one surface of the carrier, such as with at least one circumferential surface of the carrier, to position the carrier relative to a position of the sample handling device.

The system can comprise at least one of the above sample identification device.

The carrier can be made of a magnetic material. The carrier can be fully or partially made of one or more of at least one magnetically soft material or at least one ferromagnetic material. The carrier can be a rotationally symmetric disk. The carrier can comprise at least one receptacle for receiving the vessel.

The system can further comprise at least one vessel received in the receptacle. The vessel can be a tube. The vessel can protrude from the receptacle on an upper side of the carrier.

The system can further comprise at least one transportation device for transporting a plurality of the carriers.

A diagnostics device for identifying at least one property of a plurality of samples is presented. The diagnostics system can comprise at least one of the above system and at least one analytical device configured for performing at least one analytical operation with the samples.

A method for handling a sample, specifically for use in a high-throughput diagnostics device is presented. The method can comprise magnetically holding a carrier carrying at least one vessel having a sample disposed therein in a sample handling device by using at least one magnetic positioning device.

The method can further comprise reading at least one identifier attached to the vessel carried by the carrier, by using at least one reader.

The method can further comprise orienting the carrier within the sample handling device by using at least one rotor. The step of orienting the carrier can comprise orienting at least one identifier attached to the vessel carried by the carrier.

The method can further comprise transporting the carrier to the sample handling device, rotating the carrier within the sample handling device by using the rotor, until the identifier is readable, and reading the identifier.

The abutment surface can be angled. The abutment surface can be shaped so as to provide a line contact with the carrier. The abutment surface can comprise at least two surface portions inclined with respect to one another.

The transportation device can have a transport surface for the carrier and bobbins. A hand-over position for the carrier at the sample handling device, which can be defined by the abutment surface, can be placed in-between two bobbins.

Referring initially to FIG. 1, FIG. 1 is an example of a sample handling device 128 and of a sample identification device 110 shown in a perspective view. The embodiment shown in this figure may also be an exemplary embodiment of a system 112 for sample handling, the system 112 having, besides the sample handling device 128 and/or the sample identification device 110, a carrier 114, in this case also referred to as a puck 116, for carrying at least one vessel 118, such as tube 120. Within the vessel 118, at least one sample 122, such as at least one biological specimen, may be received. In the following, the vessel 118, with the sample 122 therein, can also be referred to as "the sample". The system 112 may further comprise at least one transportation device 124, which is only symbolically depicted in FIG. 1, which can be adapted for transporting the at least one carrier 114, such as a plurality of carriers 114. For exemplary embodiments of the transportation device 124, reference may be made to WO 2011/138448 A1. Thus, the transportation device 124 may be adapted for transporting the carriers 114 by magnetic forces. Other embodiments, however, are feasible. Thus, the transportation device 124, as an example, may comprise a sliding surface, on which the pucks 116 may slide, wherein underneath the sliding surface one or more magnets may be placed for magnetically moving the pucks 116 to a desired location.

FIG. 1 is further an exemplary embodiment of a part of a diagnostics device 126 for identifying at least one property of a plurality of samples 122. The diagnostics device 126 may further comprise at least one analytical device configured for performing at least one analytical operation with the samples 122. The analytical device is not depicted in FIG. 1. For exemplary embodiments, again, reference may be made to, for example, WO 2011/138448 A1. Other embodiments, however, are feasible.

The sample identification device 110, in the exemplary embodiment shown in FIG. 1, can comprise the at least one sample handling device 128 and at least one reader 130 for reading at least one identifier 132 attached to the vessel 118. It can be noted that the system 112 for sample handling, besides the at least one sample handling device 128 comprised by the optional sample identification device 110, additionally or alternatively may comprise one or more other sample handling devices 128. Thus, on the left-hand side of FIG. 1, an additional sample handling device 128' is shown, which may be embodied essentially like the sample handling device 128 shown in further detail below. However, the additional sample handling device 128' may not comprise any rotors and may not be embodied for rotating any carriers 114. The additional sample handling device 128' may simply be used for holding a carrier 114 on an abutment surface 160. The additional sample handling device 128', as an example, may be part of a sample removal station 133 in which the vessel 118 may be taken out of the carrier 114, such as in a predetermined orientation, such as by a robot or another removal system, for transfer into e.g. a vessel rack, which is not shown in this figure. Other embodiments, however, are feasible.

The system 112 may further comprise at least one holding-down device 134 for holding down the carrier 114. The at least one holding-down device 134 may be part of the sample handling device 128, as seen in the sample identification device 110 on the right-hand side of FIG. 1, or may also, additionally or alternatively, be fully or partially embodied as an independent holding-down device 134 having at least one abutment element 196, as seen on the left-hand side of FIG. 1.

The reader 130 specifically may be or may comprise at least one barcode reader 136, such as a line-scanner. As an example, the line-scanner may be configured to scan a longitudinal axis of the tube 120. Consequently, the identifier 132 specifically may be or may comprise at least one barcode 138, such as at least one one-dimensional barcode.

The carriers 114, such as the pucks 114, may fully or partially be made of at least one magnetic material, such as at least one magnetic coating. Further, the carriers 114 may comprise at least one receptacle 140 for receiving one or more, in one embodiment precisely one, vessel 118, such as at least one tube 120. As an example, the receptacle 140 may be configured for concentrically receiving the vessel 118. Thus, the pucks 116, as an example, may be configured in a rotational symmetrical way, with the tubes 120 oriented substantially parallel to a rotational axis of the symmetry.

One or more of the sample handling device 128, the sample identification device 110, the system 112 or the diagnostics device 126 may further comprise at least one controller 142, which is only symbolically depicted in FIG. 1. As an example, the controller 142 may comprise one or more processors and/or one or more computing devices.

The transportation device 124 can transport a carrier 114 to the sample identification device 110 and, therein, to the sample handling device 128. Details of an embodiment of the sample handling device 128 are shown in FIGS. 2A-E. These Figs. show the sample handling device 128 in a perspective top view (FIG. 2A), in a cross-sectional side view (FIG. 2B), in a perspective view from below (FIG. 2C), in a cross-sectional top view (FIG. 2D) and in a front view (FIG. 2E).

The sample handling device 128, firstly, as visible e.g. in FIGS. 2A and 2C, can comprise a housing 144 with a connection element 146 for mounting the housing 144 to other parts of the system 112, such as to other parts of the sample identification device 110, such as to a main body 148 of the sample identification device 110. The connection element 146 is not depicted in the remaining Figs. The housing 144 may comprise one or more guiding elements 150 for guiding the carrier 114 to the sample handling device 128, such as one or more guiding surfaces.

The sample handling device 128 can further comprise at least one magnetic positioning device 152. As an example, the magnetic positioning device 152 may comprise at least one electromagnet 154, having at least one core 156 and at least one coil 158 which can be disposed on the core 156.

The sample handling device 128, as explained above, may comprise one or more holding-down devices 134, such as by providing one or more abutment elements 196 forming a protruding edge on an upper side of the sample handling device 128 which can protrude on top of the carrier 114 located in the sample handling device 128, in order to hold down the carrier 114 in a flat position.

The sample handling device 128 may further comprise or form a abutment surface 160 which can be formed by the core 156 and other elements of the sample handling device 128, such as the housing 144 and/or the rotors 168, 170 which will be explained in further detail below. A carrier 114, as can be seen in FIG. 1, can engage into the abutment surface 160, as e.g. can be seen more clearly in the embodiments shown in FIGS. 2D, 3, 4 and 11. The abutment surface 160 specifically may be a non-flat or even a curved abutment surface. The curvature of the abutment surface 160 may resemble the outer curvature of the carrier 114, such that the abutment surface 160 can partially surround the outer surface of the carrier 114 and/or such that the abutment surface 160 can be configured to form a form-fit connection with the carrier 114. The abutment surface 160 may get close to the carrier 114 or may even get in contact with the carrier 114. The abutment surface 160, as an example, may have a shape which is similar to an outer shape of the carrier 114. As an example, the abutment surface 160 may have a curved shape, with a radius of curvature which is identical or similar to the radius of the carrier 114.

The core 156, as will be outlined in further detail below, may have a plurality of arms 162, wherein the coil 158 can be disposed, e.g., in a middle arm 164, wherein two outer arms 166 may be part of the housing 144 and may be located outside the coil 158. Thus, as an example, the core 156 may be an E-shaped core. Other embodiments are feasible, as will be outlined in further detail below.

The sample handling device 128 may further comprise a plurality of rotors 168, 170, which specifically may be located symmetrically with respect to the core 156, as visible in the front view in FIG. 2E. The core 156 in conjunction with the rotors 168, 170 may form the abutment surface 160, such that the carrier 114, specifically the puck 116, may be in contact with the rotors 168, 170. The rotors 168, 170 may fully or partially be made of a metallic material, such as a magnetic metallic material, e.g. non-magnetic stainless steel. The rotors 168, 170 may fully or partially be made of a non-magnetic material. The use of a non-magnetic material allows a simple reversal of the magnetic force in order to release the carrier 114 from the sample handling device 128. The choice of other materials, however, is feasible.

The rotors 168, 170 may comprise at least one rubberization 172 in order to increase a frictional force between the rotors 168, 170 and the carrier 114. As an example, the rotors 168, 170 may rotate into a first rotational direction 174, inducing the puck 116 to rotate into a second rotational direction 176, as visible in FIG. 1. The sample handling device 128 may comprise one or more drives 178 configured to drive a rotation of one or both of the rotors 168, 170. Preferably, the drive 178 can be configured to drive the rotors 168, 170 in a synchronized way. As an example, the drive 178 may comprise at least one driving belt 180, which may be driven by at least one motor 182, such as at least one step motor 184. The motor 182 specifically may drive the driving belt 180 via at least one spool 186 which can be connected to rotor shafts 188, 190 of rotors 188, 170, respectively, via the driving belt 180. The drive 178 may further comprise at least one belt-tensioning device 192, such as at least one spring-driven belt-tensioning device 192, as depicted e.g. in FIGS. 2A-B.

By a magnetic pulling force exerted by the electromagnet 154 onto the carrier 114, the carrier 114 can be pulled against the rotors 168, 170. Thereby, the frictional force between the carrier 114 and the rotors 168, 170 can be increased, and a transfer of the rotational movement onto the carrier 114 can be performed at a lower slip compared to the case in which no pulling or pushing force is exerted onto the carrier 114. Further, as compared to a pushing actor, which pushes the carrier 114 onto the rotors 168, 170, the pulling actor of the magnetic positioning device 152 can require a lower space. In FIG. 1, the attractive force which can be exerted by the magnetic positioning device 152 onto the carrier 114 is denoted by reference number 194.

The scanning of the vessel 118 by the reader 130 may take place during rotation of the vessel 118. The reader 130 may search for the identifier 132 during rotation and may read the identifier 132 when found. After detection of the identifier 132, the vessel 118 may be rotated further, until the identifier 132 optionally points into a specific, predetermined direction. Subsequently, the carrier 114, by the transportation device 124, may be transferred into the sample removal station 133, therein, the vessel 118 may be taken out of the carrier 114, while the carrier 114 is held in place by an abutment element 196 of the holding-down device 134. The vessel 118 may be taken out by an arbitrary actuator, such as a by a robot, which is not depicted in the Figs.

In FIG. 2D, the main magnetic flux of the electromagnet 154 is denoted by reference number 198 and is symbolically depicted as a dashed line. Further, in this Figure, a magnetic shunt or scatter or diffusion flux is denoted by reference number 200 and is symbolically depicted as a dotted line. The main magnetic flux 198 can be usable for attracting the carrier 114, whereas, without wishing to be bound by theory, the scatter flux 200 may be considered a loss, which typically does not contribute to the desired magnetic force to fix the carrier at the desired position.

In order to improve the main magnetic flux 198 and the efficiency of the magnetic positioning device 152, the electromagnet 154 may be varied. Thus, as depicted in FIG. 2D in the cross-sectional view, the core 156 of the electromagnet may have the shape of an E, having the arms 164, 166, with the coil 158 being located on the middle arm 164. As outlined above, the rotors 168, 170 may fully or partially be made of a magnetic material and may be located in between the carrier 114 and the outer arms 166 of the core 156. Thus, the number and the dimension of the gaps in the magnetic circuit may be reduced.

Figure 2:
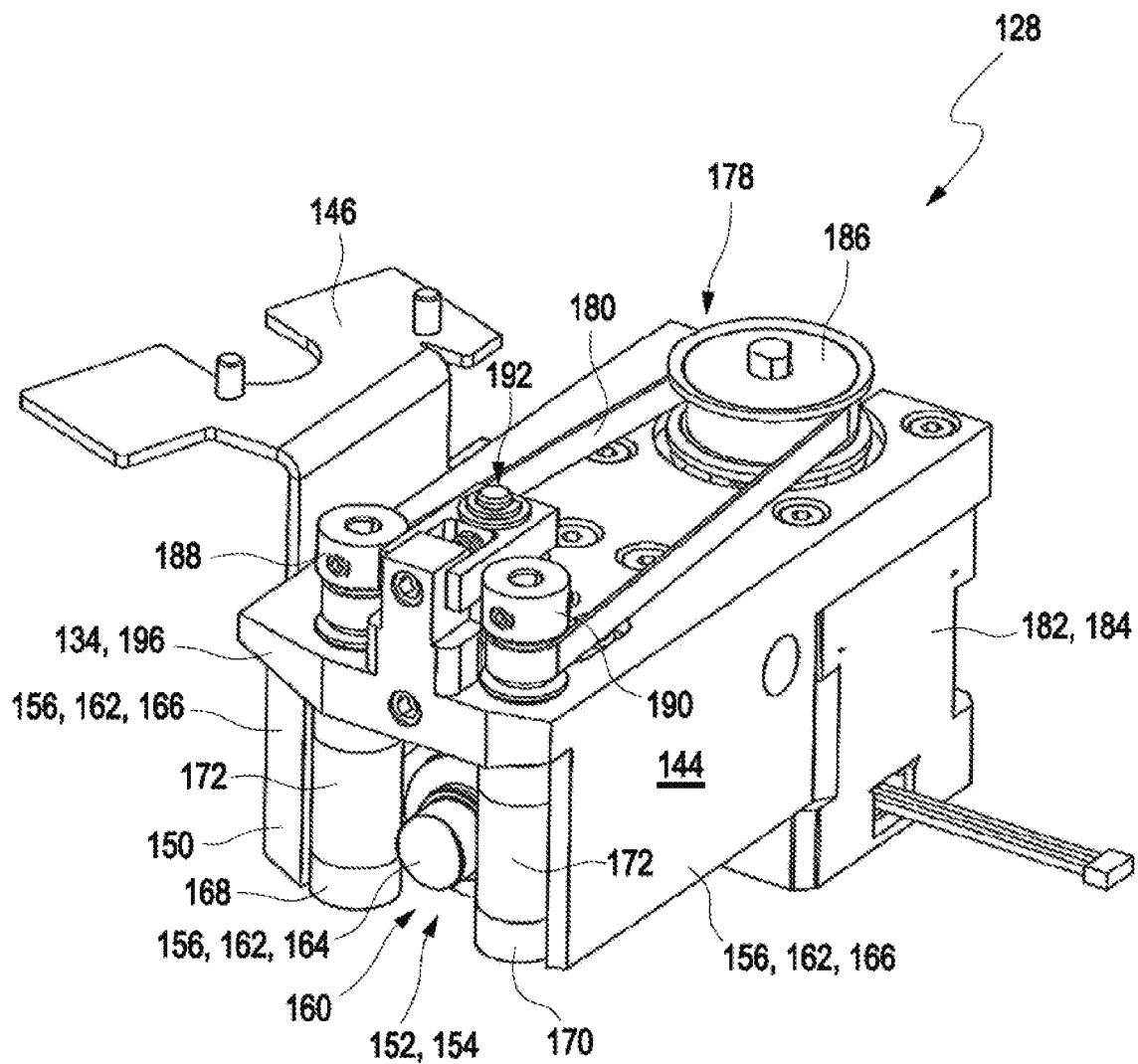
FIGS. 2A-E illustrate different views of a sample handling device according to an embodiment of the present disclosure.
Figure 2:
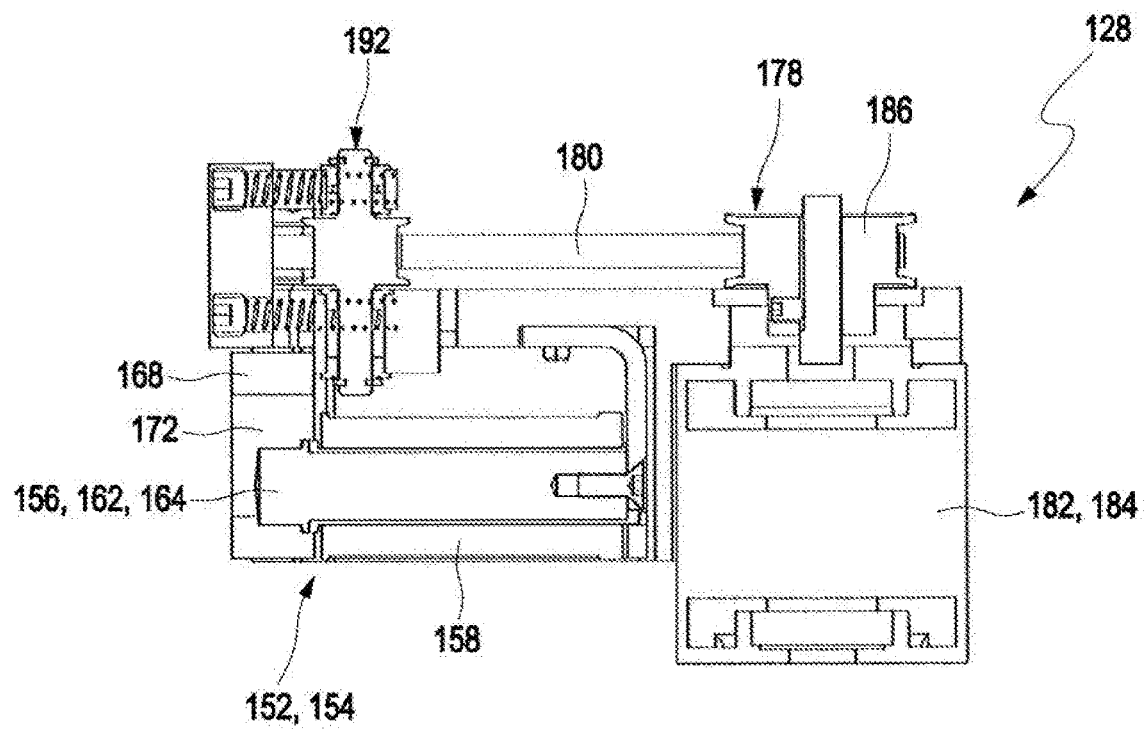
Figure 2:
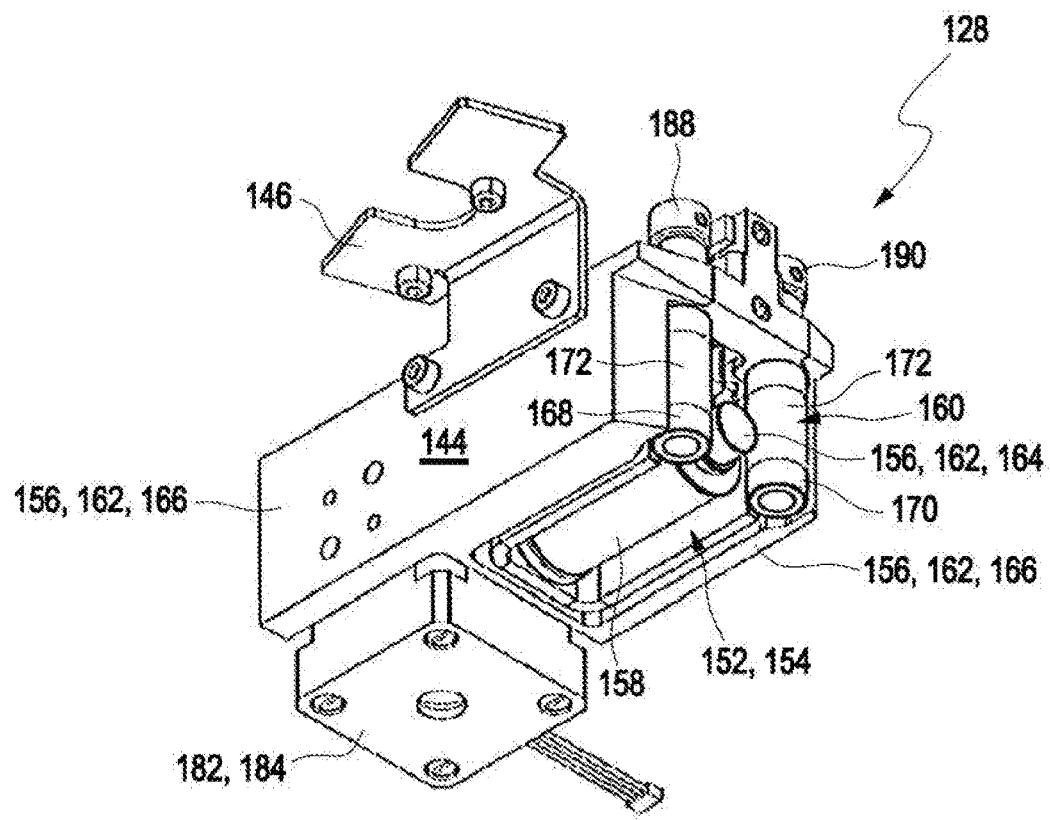
Figure 2:
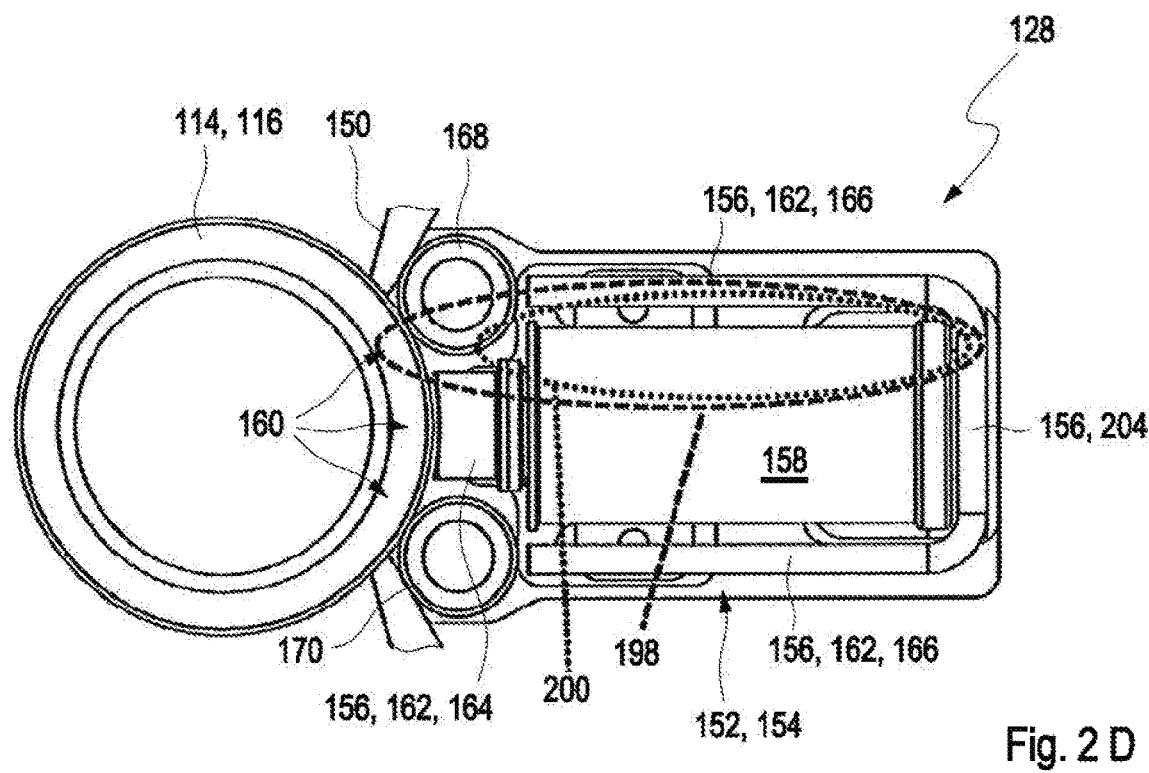
Figure 2:
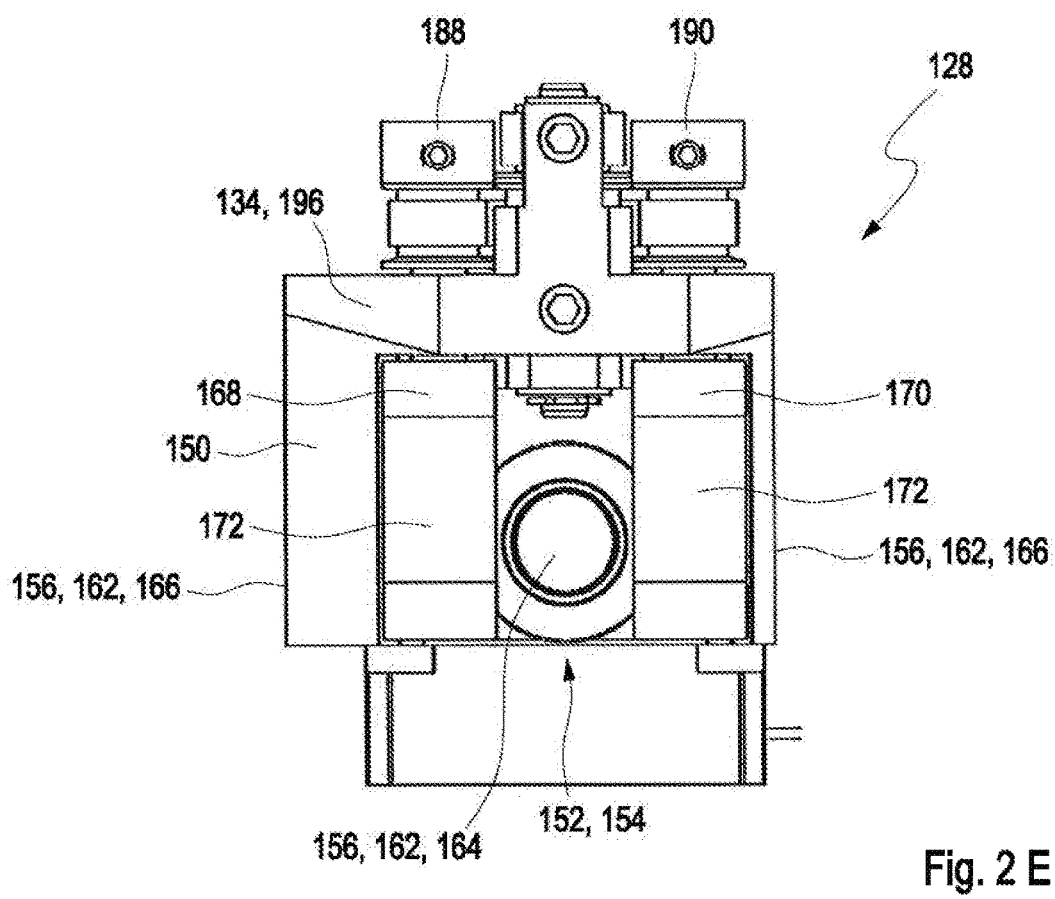

However, as will be depicted in the alternative embodiments shown in FIGS. 3 to 12, other setups are generally feasible. These embodiments only show the magnetic positioning device 152, the rotors 168, 170 and the carrier 114. For further potential embodiments of details of the sample identification device 110, the system 112, the sample handling device 128 and the diagnostic device 126, reference can be made to the description of FIGS. 1 to 2E given above. It can be noted, however, that other embodiments are feasible.

Firstly, FIGS. 3, 4 and 7 to 12 show embodiments in which the core 156 has an E-shape, with the coil 158 being located on a middle arm 164 of the core 156. The embodiments mainly differ in the way that ends 202 of the outer arms 166 are designed. In each case, the ends 202, as well as the middle arm 164, extend from a backbone 204 of the core 156 and, more or less, point towards the carrier 114. Thus, the carrier 114 can close a magnetic loop, in conjunction with the core 156. As can be seen in these Figs., specifically in FIGS. 3, 4, 9, 10 and 11, the abutment surface 160 of the core 156 may be located at a distance to the carrier 114, thereby forming a slight gap. The abutment surface 160, however, may be curved, in order to mirror the shape of the outer surface of the carrier 114. Specifically, the abutment surface 160 may be a concave surface, with a cylinder-type concave shape. As can further be seen, the core 156 may have a front surface facing the carrier 114 which may form part of the abutment surface 160 and which may have a curved shape, such as with a radius of curvature corresponding to a radius or mean radius of curvature of the abutment surface 160.

Figure 3:
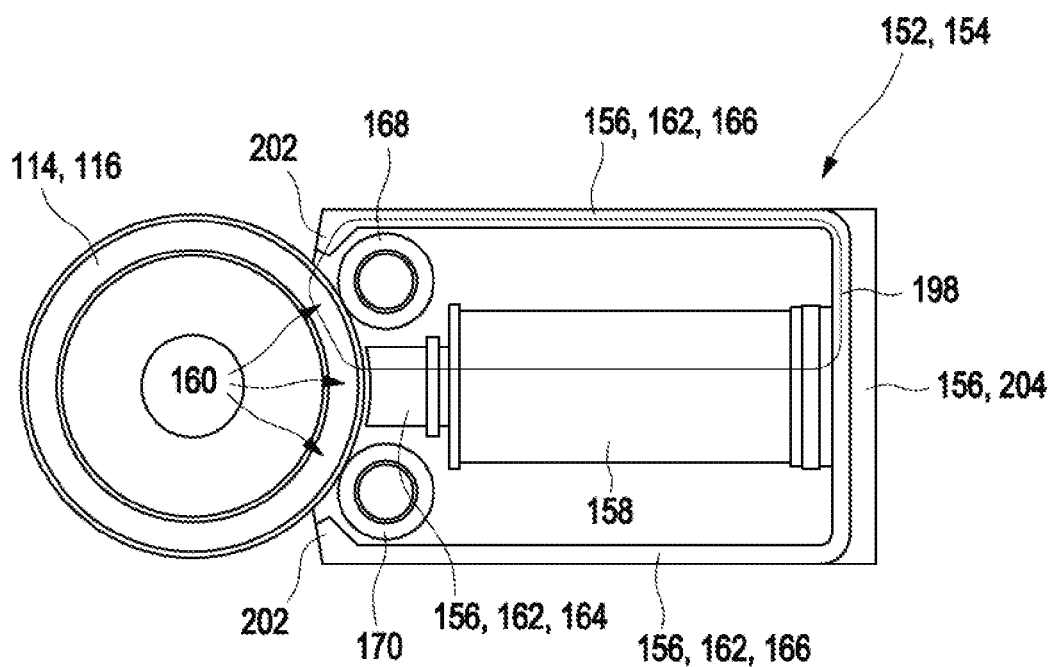
FIGS. 3-12 illustrate alternative embodiments of a sample handling device according to the present disclosure.
Figure 4:
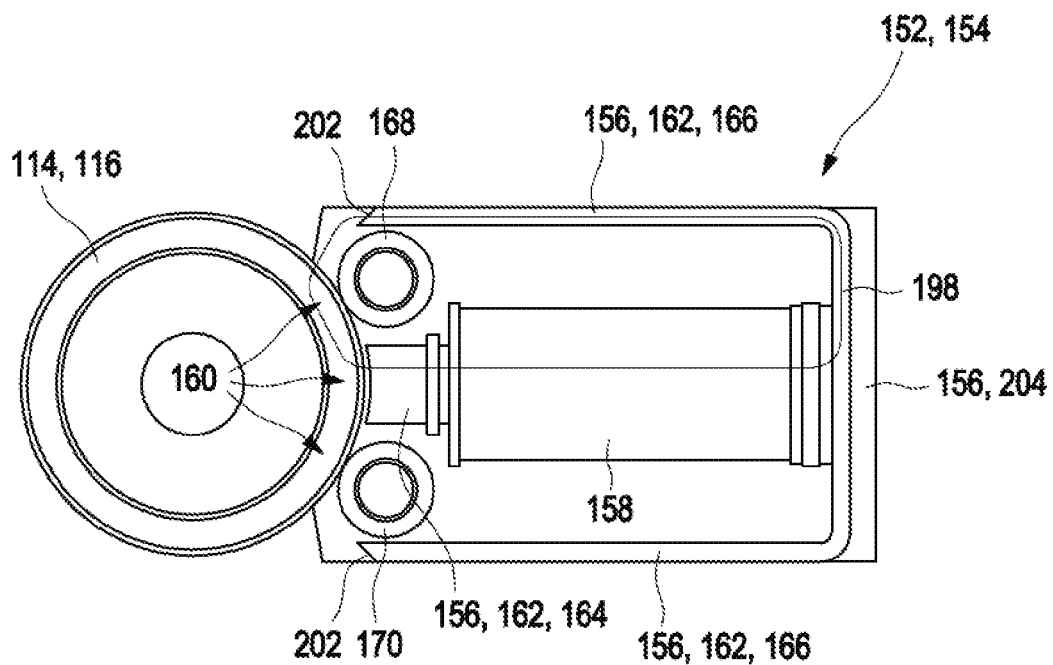

In the embodiment shown in FIG. 3, the ends 202 of the outer arms 166 can be bent inwardly, facing towards the carrier 114, wherein the rotors 168, 170 can be outside the magnetic circuit. Contrarily, in FIG. 4, the ends 202 can be blunt, ending next to the rollers 167, 170.

Figure 7:
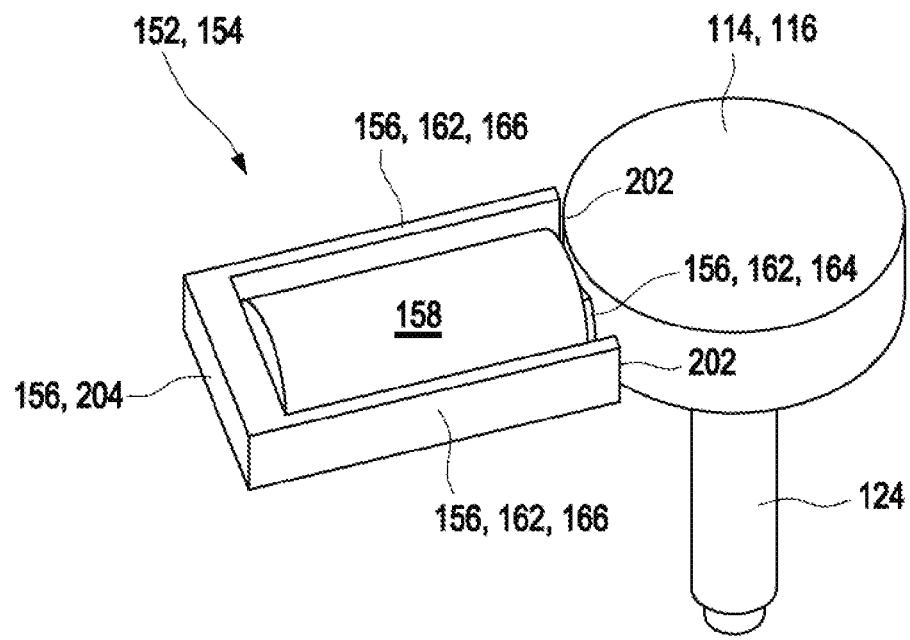

In the embodiment shown in FIG. 7, no rollers 168, 170 can be provided. The ends 202 of the outer arms 166 can be blunt, facing directly the carrier 114.

Figure 8:
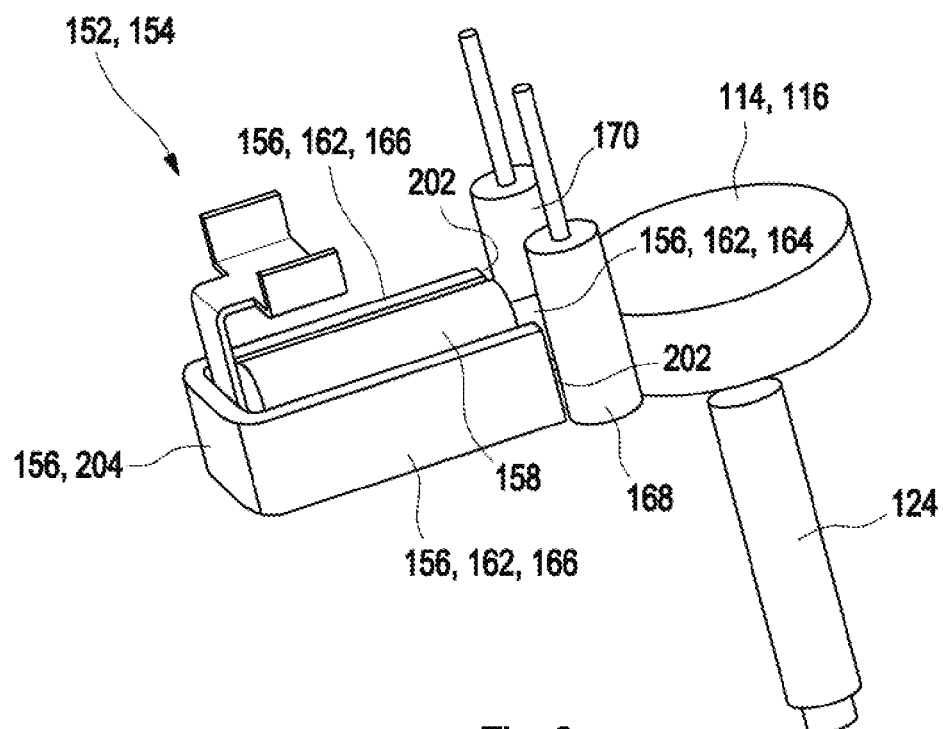

In the embodiment shown in FIG. 8, similarly to the embodiment of FIG. 7, blunt ends 202 of the arms 166 can be provided. Still, additionally, rotors 168, 170 can be provided in between the ends 202 and the carrier 114, wherein, preferably, the rotors 168, 170 may fully or partially be made of a magnetic material.

Figure 9:
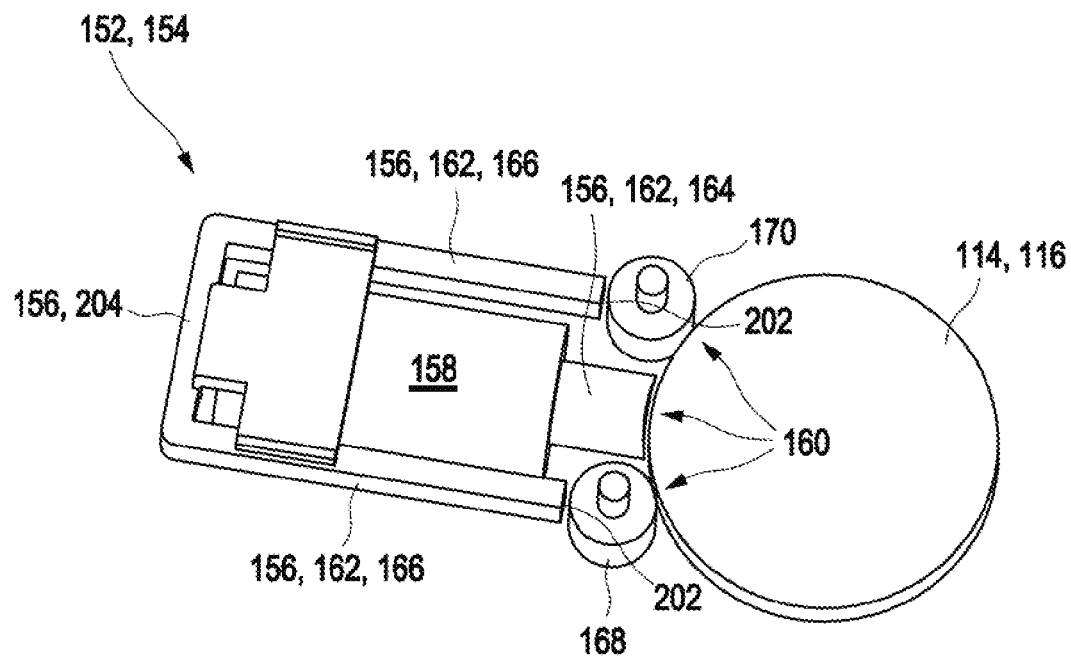

FIG. 9 shows a setup which is fairly similar to the setup of FIG. 8. Again, rotors 168, 170 may be located in between blunt ends 202 of the outer arms 166 and the carrier 114. The rotors 168, 170 may fully or partially be made of a magnetic or of a non-magnetic material.

Figure 10:
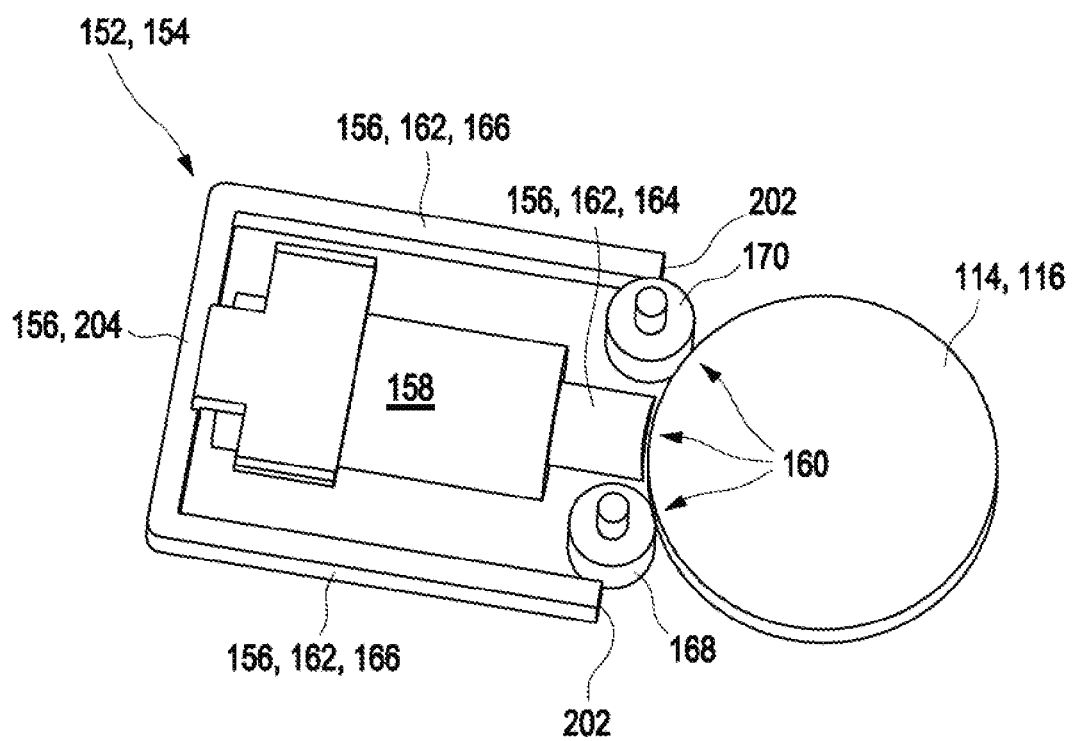

In a setup shown in FIG. 10, similar to the embodiment shown above in FIGS. 3 and 4, blunt ends 202 can be provided on an outer surface of rotors 168, 170.

Figure 11:
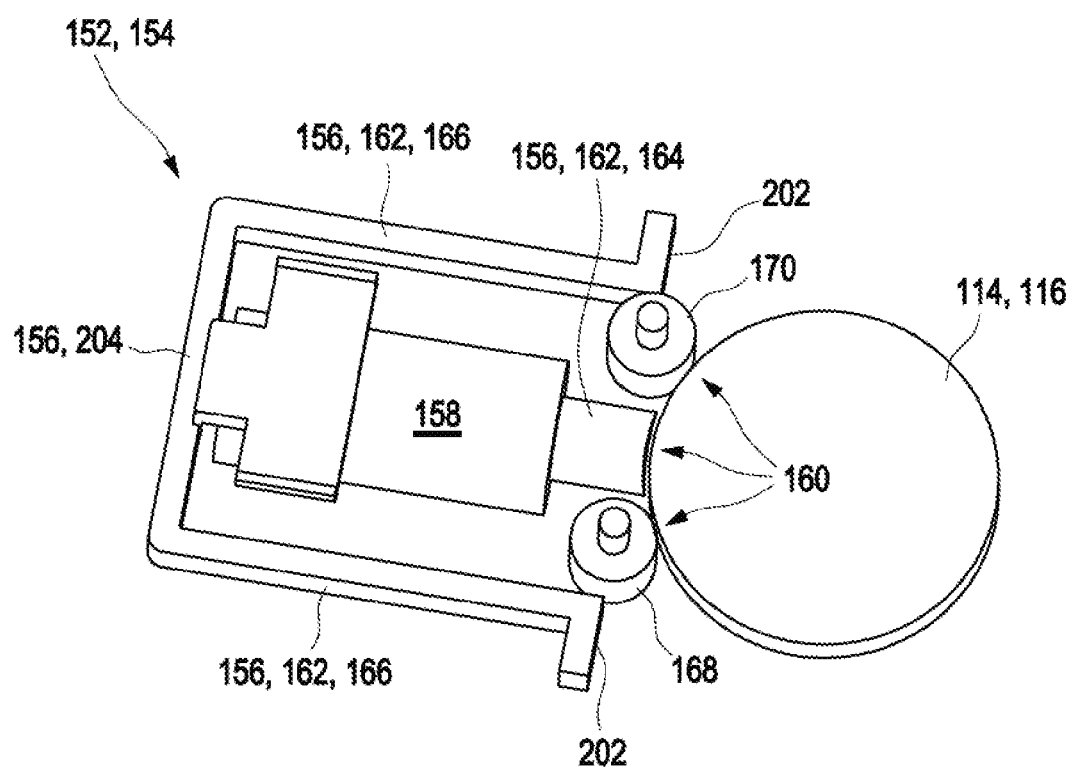

In a further embodiment, shown in FIG. 11, which is similar to the embodiment shown in FIG. 10, ends 202 of the outer arms 166 can be provided such that rotors 168, 170 can be located in between the ends 202 and the middle arm 164. The ends 202, however, can be bent outwardly. As outlined above, the core 156 may fully or partially be used, simultaneously, as a housing 144 of the sample handling device 128 or of a part thereof. By increasing or decreasing a distance between the core 156 and the carrier 114, losses may be compensated for.

Figure 12:
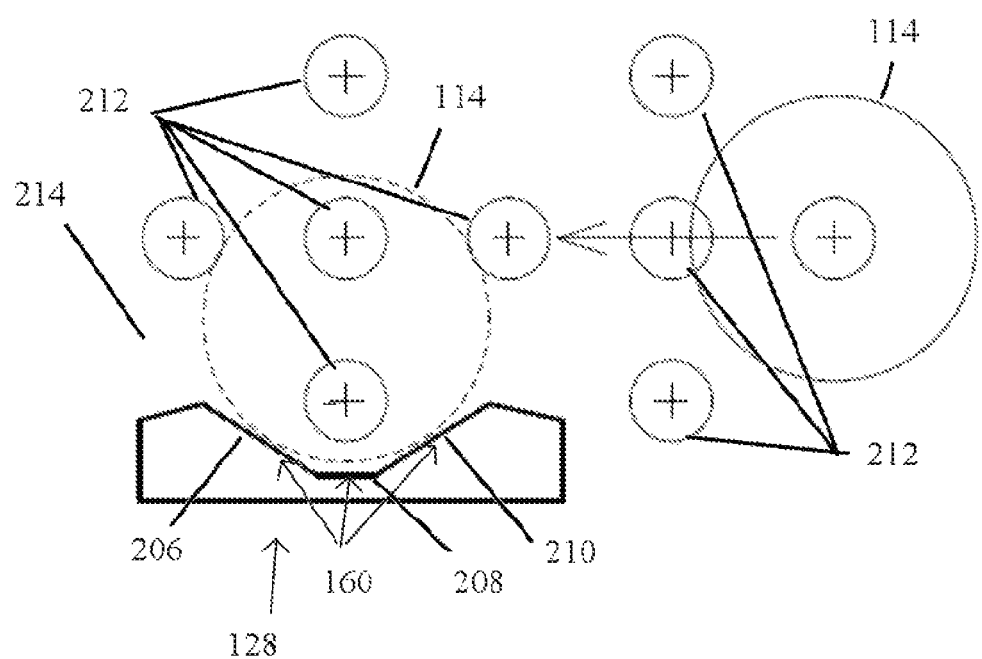

In a further embodiment, shown schematically in FIG. 12, the sample handling device 128 can comprise or form an abutment surface 160 being different from the abutment surfaces 160 described with respect to the previous embodiments. Particularly, the abutment surface 160 of the embodiment shown in FIG. 12 is not curved but angled. In other words, the abutments surface 160 can comprise at least two surface portions being inclined with respect to one another. In the embodiment shown in FIG. 12, the abutment surface 160 can comprise a first surface portion 206, a second surface portion 208 and a third surface portion 210. The first surface portion 206 and the second surface portion 208 can transition into one another. Similarly, the second surface portion 208 and the third surface portion 210 can transition into one another. Thus, the second surface portion 208 can be located between the first surface portion 206 and the third surface portion 210. The first surface portion 206 and the second surface portion 208 as well as the second surface portion 208 and the third surface portion 210 can be inclined to one another so as to respectively form obtuse angles therebetween. The obtuse angles may be identical. A carrier 114 can engage into the abutment surface 160, as described above. However, due to the specific shape of the abutment surface 160, the abutment surface 160 may not provide a surface contact with the carrier 114. Rather, the carrier 114 can contact the abutment surface 160 at predetermined lines extending substantially perpendicular with respect to the plane of projection of FIG. 12. In the embodiment shown in FIG. 12, the carrier can contact the abutment surface 160 at one line located at the first surface portion 206 and one line located at the third surface portion 210. Thus, only two lines of contact are provided by the abutment surface 160. Optionally, the abutment surface 160 may be shaped such that the carrier 114 may also contact abutment surface 160 at one line at the second surface portion 208. The specific shape of the abutment surface 160 can provide the same advantages as the previous embodiments. In addition, the specific shape of the abutment surface 160 of the embodiment show in FIG. 12 can avoid potential oscillation of the carrier 114 after the impact with the abutment surface 160.

In FIG. 12, circles with cross can be the position of bobbins 212 of the underlying transport surface 214. A force can be created by the bobbins 212 to a permanent magnet in the carrier 114 to slide the carrier 114 on the surface 214 as e.g. described in EP 2 566 787 or WO 2013/064656. Usually the carrier 114 can be positioned or stopped directly above a bobbin by an attractive force of the respective bobbin. For the hand-over position at the clamping device for the carrier 114, which can be defined by the abutment surface 160 of the sample handling device 128, 128', this position can be placed in-between two bobbins 212. This can have the advantages that on one hand the carrier 114 can be pressed against the abutment surface 160 by the respective electromagnetic forces and can be also removed from the clamping device to overcome possible remaining magnetic forces form the electromagnet which can attract the carrier 114, e.g. for the magnetic positioning device 152.

Figure 5:
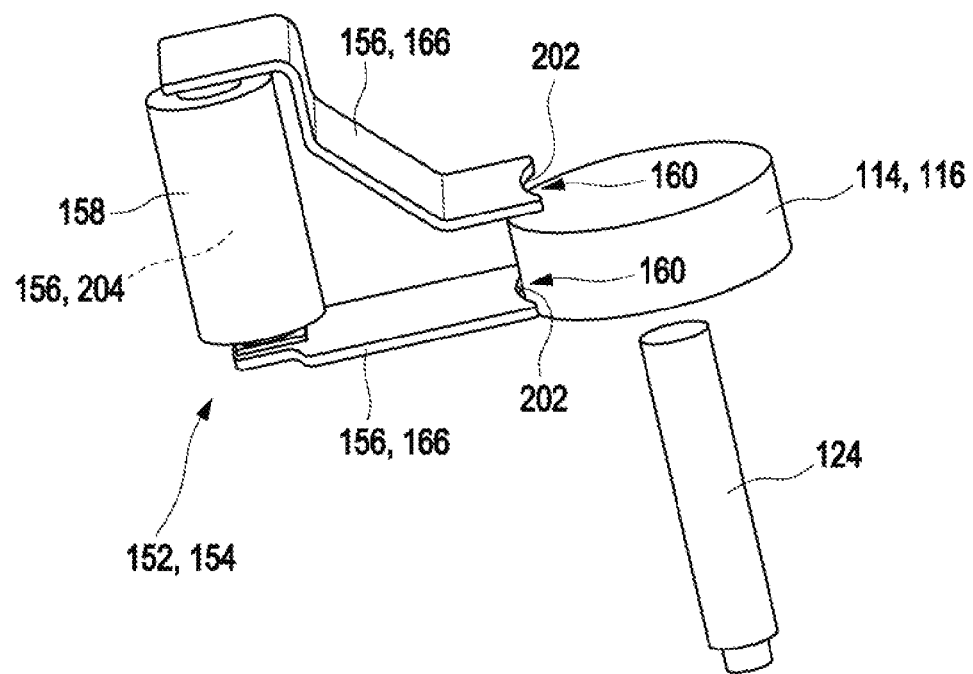
Figure 6:
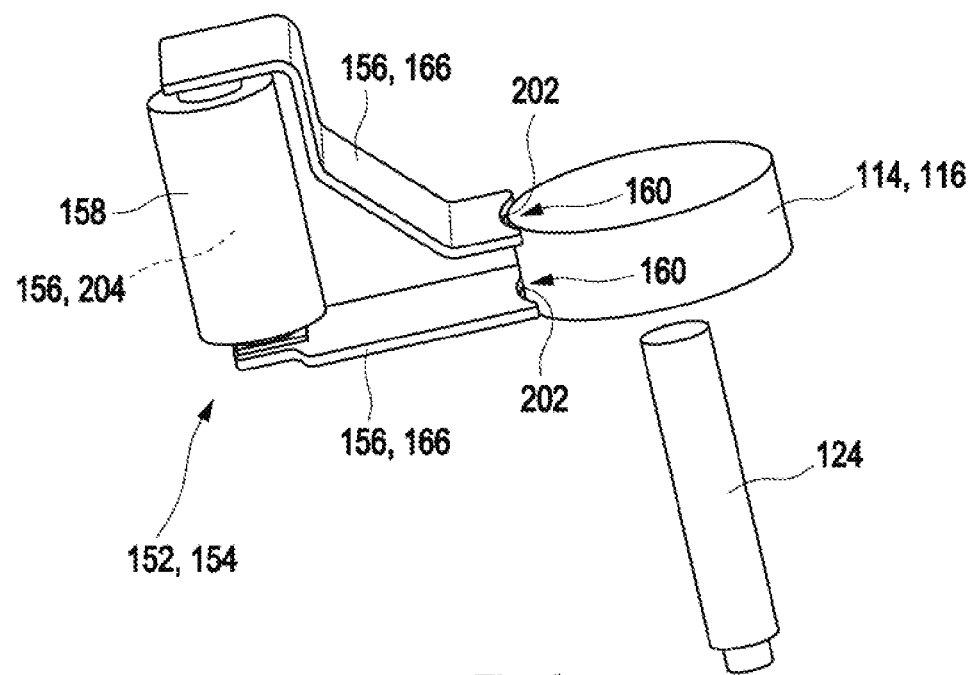

As opposed to the E-shaped cores 156 in the embodiments shown in FIGS. 1 to 4 and 7 to 12, other types of cores 156 may be used. Thus, as an example, FIGS. 5 and 6 show embodiments of a magnetic positioning device 152 in which, generally, a U-shaped core 156 can be used. Therein, the electromagnet 154 can comprise a backbone 204 onto which the coil 158 of the electromagnet 154 can be disposed. On each end of the backbone 204, an outer arm 166 can be disposed, which may have a straight shape, such as the lower one of the outer arms 166 in FIGS. 5 and 6, or which be bent, as shown in the upper one of the outer arms 166 in FIGS. 5 and 6. Ends 202 of the outer arms 166 may fully or partially point towards the carrier 114. Thus, as an example, in the embodiment of FIG. 5, the lower one of the outer arms 166 can point towards the carrier 114, whereas the upper one of the outer arms 166 can be located on top of the flat, disc-shaped carrier 114. In the embodiment shown in FIG. 6, contrarily, both ends 202 of the outer arms 166 can point towards the carrier 114.

Again, one or both of the ends 202 of the core 156 may form part of the abutment surface 160. Again, as an example, the abutment surface 160, as shown in these Figs., may have a cylindrical shape, mirroring the outer surface of the cylindrical carrier 114.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A sample handling device, the sample handling device comprising:
   at least one magnetic positioning device configured for magnetically holding a carrier configured for carrying at least one vessel in the sample handling device; and
   at least two rotors configured to rotate the carrier within the sample handling device, wherein the at least one magnetic positioning device is configured to pull the carrier onto the at least two rotors by magnetic force, wherein the at least one magnetic positioning device is at least partially located in between the at least two rotors.

2. The sample handling device according to claim 1, wherein the at least two rotors are driven by at least one motor.

3. The sample handling device according to claim 1, further comprising,
   at least one holding-down device configured to hold down the carrier.

4. The sample handling device according to claim 1, wherein the at least one magnetic positioning device comprises at least one electromagnet.

5. The sample handling device according to claim 1, further comprising,
   at least one abutment surface into which the carrier engages such that the at least one abutment surface partially surrounds the carrier and positions the carrier within the sample handling device.

6. A sample identification device, the sample identification device comprising:
   at least one sample handling device according to claim 1; and
   at least one reader configured to read at least one identifier attached to the at least one vessel carried by the carrier.

7. A system for sample handling, the system comprising: at least one sample handling device according to claim 1; and at least one carrier according to claim 1 configured to carry the at least one vessel according to claim 1.

8. The system according to claim 7, wherein the at least one sample handling device comprises at least one abutment surface which is configured to engage with a surface of the at least one carrier to position the at least one carrier relative to a position of the at least one sample handling device.

9. The system according to claim 8, further comprising,
   at least one transportation device having a transport surface for the at least one carrier and bobbins, wherein a hand-over position for the at least one carrier at the at least one sample handling device, which is defined by the at least one abutment surface, is placed in-between two bobbins.

10. A diagnostics device for identifying at least one property of a plurality of samples, the diagnostics system comprising:
at least one system according to claim 9; and
at least one analytical device configured for performing at least one analytical operation with the plurality of samples.

11. A method for sample handling, the method comprising:
magnetically holding a carrier carrying at least one vessel having a sample disposed therein in a sample handling device according to claim 1 by using the at least one magnetic positioning device; and
pulling the carrier configured for carrying the at least one vessel in the sample handling device onto the at least two rotors by magnetic force using the at least one magnetic positioning device.

12. The method according to claim 11, further comprises,
reading at least one identifier attached to the at least one vessel carried by the carrier, by using at least one reader; and
rotating the carrier within the sample handling device by using the at least two rotors.

\* \* \* \* \*